United States Patent
Ohta

(10) Patent No.: US 9,498,716 B2
(45) Date of Patent: Nov. 22, 2016

(54) VIDEO GAME DEVICE AND STORAGE MEDIUM STORING VIDEO GAME PROGRAM

(75) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 3125 days.

(21) Appl. No.: 11/514,935

(22) Filed: Sep. 5, 2006

(65) Prior Publication Data

US 2007/0213128 A1     Sep. 13, 2007

(30) Foreign Application Priority Data

Mar. 9, 2006   (JP) ................................ 2006-064438

(51) Int. Cl.
```
A63F 13/00      (2014.01)
A63F 13/493     (2014.01)
A63F 13/428     (2014.01)
A63F 13/219     (2014.01)
A63F 13/211     (2014.01)
```

(52) U.S. Cl.
CPC .............. *A63F 13/493* (2014.09); *A63F 13/04* (2013.01); *A63F 13/428* (2014.09); *A63F 13/211* (2014.09); *A63F 2300/105* (2013.01); *A63F 2300/636* (2013.01)

(58) Field of Classification Search
CPC ............................... A63F 13/04; A63F 13/493
USPC ...................................... 463/37, 43; 345/156
See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 6,749,503 B1 | 6/2004 | Kazama et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 2003/0216176 A1 | 11/2003 | Shimizu et al. | |
| 2004/0204230 A1 | 10/2004 | Kazama et al. | |
| 2005/0212755 A1* | 9/2005 | Marvit .......................... | 345/156 |

(Continued)

FOREIGN PATENT DOCUMENTS

| | | |
|---|---|---|
| EP | 1 291 047 | 3/2003 |
| JP | 2001-38049 | 2/2001 |

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner* — Reginald Renwick

(74) *Attorney, Agent, or Firm* — Nixon & Vanderhye P.C.

(57) ABSTRACT

A video game device successively obtains game data, which changes according to the state of the input device and is used in the game process. The video game device stores game data obtained at a point in time when the game process is paused. The video game device successively compares current game data with the stored game data, after starting to accept cancellation of the pause. The pause is canceled to resume the game process when a difference between a value of the current game data and a value of the game data stored in the storage means becomes smaller than a predetermined reference.

20 Claims, 24 Drawing Sheets

(56) References Cited

U.S. PATENT DOCUMENTS

2006/0046848 A1 3/2006 Abe et al.
2007/0150842 A1* 6/2007 Chaudhri et al. ............. 715/863

OTHER PUBLICATIONS

ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.
Wilson, Andrew D., et al.; "Demonstration of the XWand Interface for Intelligent Spaces"; Microsoft Research; UIST '02 Companion; pp. 37-38.
Wilson, Daniel, et al.; "Gesture Recognition Using the XWand"; Robotics Institute; Carnegie Mellon University; tech report CMU-RI-TR-04-57; Apr. 2004.
Wilson, Andy, "XWand: UI for Intelligent Environments"; Apr. 26, 2004; retrieved May 12, 2009 from http://research.microsoft.com/en-us/um/people/awilson/wand/default.htm.
Wilson, Andrew, et al.; "XWand: UI for Intelligent Spaces"; Microsoft Research; CHI 2003, Apr. 5-10, 2003; Ft. Lauderdale, FL.
Selectech Air Mouse, Description; retrieved on May 5, 2009 from http://cgi.ebay.com.my/ws/eBayISAPI.dll?ViewItem&item=350096666675&indexURL.
European Search Report for EP 06 01 8344, search completed Nov. 8, 2006.
Manual for Korokoro Kaabii; Kirby Tilt 'n' Tumble; Nintendo Co., Ltd., Aug. 23, 2000; pp. 8-11 with English translation pp. 4-7.

* cited by examiner

VIDEO GAME DEVICE AND STORAGE MEDIUM STORING VIDEO GAME PROGRAM

CROSS REFERENCE TO RELATED APPLICATION

The disclosure of Japanese Patent Application No. 2006-064438 is incorporated herein by reference.

BACKGROUND

1. Field

Example embodiments of the present invention relate to a video game program and, more particularly, to a video game device and a video game program in which the game operation is performed by moving an input device itself.

2. Description of the Background Art

There are conventional video game devices and video game programs in which the game operation is performed by moving an input device itself, such as a controller. For example, "Manual for Korokoro Kaabii (Kirby Tilt 'n' Tumble) (Nintendo Co., Ltd., Aug. 23, 2000), pp. 8-11, discloses a portable video game device integrated with its input device, in which the inclination of the video game device itself is calculated based on an acceleration sensor, and the direction in which a character rolls is determined based on the inclination. Thus, the player is allowed to perform the game operation by moving input device itself (the video game device in this example). Therefore, it is possible to provide the player with an interesting game operation different from the conventional game operation of simply pressing down buttons.

In the conventional video game device, the player can pause a game, and can cancel a pause to resume the game, by pressing down a predetermined button provided on the video game device during the game. Since the input device can be held at any inclination, the inclination of the input device upon pausing does not usually coincide with that upon canceling the pause. If the inclination of the input device before a pause and that after the pause do not coincide with each other, there will be an abrupt change in the game operation before and after the pause, which may result in a game operation not intended by the player upon canceling the pause. As a result, it is likely that the player makes a mistake upon canceling a pause, which may make the player think that the game's playability is poor.

SUMMARY

Therefore, an aspect of example embodiments of the present invention is to provide a video game device and a video game program, which improve the controllability of the game upon canceling a pause.

Example embodiments of the present invention have the following features to attain the objects mentioned above. Note that parenthetic expressions in the following section (reference numerals, supplementary explanations, etc.) are merely to indicate the correlation between what is described in the following section and what is described in the description of the example embodiments set out further below in the present specification, and are in no way intended to restrict the scope of the present invention.

A first aspect of an example embodiment of the present invention is directed to a video game device (3) for performing a game process (step S12 or step S42) based on a state of an input device (the controller 7) regarding at least one of a position and an orientation of the input device (i.e., the inclination of the controller 7 with respect to the rotation about an axis in the longitudinal direction thereof in the first embodiment to be described later, or the position pointed at by the controller 7 in the second embodiment to be described later). The video game device includes game data obtaining means (the CPU 10, etc., performing step S3 or S42; hereinafter only the step numbers will be shown), pausing means (S14 or S44), storage means (S15 or S46), cancel-accepting means (S22, S62 or S67), first comparison means (S32 or S53), and cancellation means (S34 or S54). The game data obtaining means is means for successively obtaining game data (the acceleration data 621 or the first cursor position data 637), which changes according to the state of the input device and is used in the game process. The pausing means is means for pausing the game process. The storage means is means for storing game data obtained at a point in time when the game process is paused. The cancel-accepting means is means for starting to accept cancellation of the pause while the game process is being paused. The first comparison means is means for successively comparing current game data, which is successively obtained by the game data obtaining means, with the game data stored in the storage means, after starting to accept cancellation of the pause. The cancellation means is means for canceling the pause to resume the game process when a difference between a value of the current game data and a value of the game data stored in the storage means becomes smaller than a predetermined reference (i.e., a predetermined value representing the difference in acceleration direction in the first embodiment to be described later, or a predetermined value representing the distance between two cursors in the second embodiment to be described later). In the first aspect, for example, the game data obtaining means may obtain data outputted from the input device as the game data, or may obtain the game data by performing a predetermined operation on the data outputted from the input device.

In a second aspect, the video game device may further include image display means (S36 or S55). The image display means is means for successively displaying an image representing the value of the game data stored in the storage means (the second model 54, the first cursor 55, the plate-shaped object 71, or the reference cursor 78) and an image representing the value of the current game data (the first model 53, the second cursor 56, the guide object 75, or the guide cursor 77) on a display device, after starting to accept cancellation of the pause.

In a third aspect, the input device may include image capturing means (the image sensing device 40) for capturing an image of a predetermined imaging target. Then, the video game device further includes position calculation means (the image processing circuit 41) for calculating coordinates of a position of the imaging target (the marker position) in the captured image obtained by the image capturing means. The game data obtaining means obtains, as the game data, data representing the coordinates, or data corresponding to a position or an orientation of the input device calculated based on the coordinates (the first cursor position data 637).

In a fourth aspect, the input device may include an acceleration sensor (37). Then, the game data obtaining means obtains, as the game data, data representing an output from the acceleration sensor (the acceleration data 621), or data corresponding to an orientation of the input device calculated based on the output from the acceleration sensor.

In a fifth aspect, the input device may output data representing a state of the input device regarding a position or an orientation thereof (the acceleration data 621 or the marker position data 623). Then, the game data obtaining means obtains, as the game data, the data outputted from the input device.

In a sixth aspect, the input device may output data representing a state of the input device regarding a position or an orientation thereof. Then, the game data obtaining means calculates and obtains, as the game data, data for controlling an object present in a virtual game space (the first cursor position data 637) based on data outputted from the input device.

In a seventh aspect, the cancel-accepting means may start to accept cancellation of a pause when instructed by a player (when the player presses the cancel-accepting button).

In an eighth aspect, the input device may include a control switch (the cancel-accepting button). Then, the cancel-accepting means starts to accept cancellation of a pause when the control switch is operated.

In a ninth aspect, the cancel-accepting means starts to accept cancellation of a pause when a predetermined amount of time elapses since when the game process is paused (i.e., when the determination result of step S61 is positive).

In a tenth aspect, the cancel-accepting means may include second comparison means (S66) and cancel-accepting means (S67). The second comparison means is means for comparing current game data successively obtained by the game data obtaining means with the game data stored in the storage means after the game process is paused. The cancel-accepting means is means for starting to accept cancellation of the pause when the difference between the value of the current game data and the value of the game data stored in the storage means becomes larger than a predetermined reference.

An example embodiment of the present invention may be provided in the form of a storage medium storing a video game program to be executed by a computer of the video game device for performing the functions of an example embodiment of the present invention as set forth above.

According to the first aspect, when the game process is paused, the storage means stores game data. The game data reflects the state of the input device. Therefore, with the use of the storage means, it is possible to store the state of the input device at the time of the pause operation (the point in time when the game process is pause). Then, the cancellation means cancels a pause when the current state of the input device and the state of the input device at the time of the pause operation become close to each other. Thus, when the pause is canceled to resume the game, it is possible to ensure that the state of the input device is substantially the same as that before the pause. Therefore, according to the first aspect, it is possible to prevent a mistake by the player due to a sudden change in the game operation before and after a pause, thus improving the controllability.

According to the second aspect, the player can visually check the current state of the input device and the state of the input device at the time of the pause operation, thereby facilitating the operation of canceling the pause.

According to the third aspect, it is possible to easily calculate the position or the orientation of the input device by using the captured image obtained by the image capturing means.

According to the fourth aspect, it is possible to easily calculate the orientation of the input device by using the acceleration detected by the acceleration sensor.

According to the fifth and sixth aspects, data outputted from the input device or data obtained based on the outputted data is stored as the game data, it is possible to accurately store the state of the input device.

According to the seventh aspect, it is possible to prevent a situation where the game is resumed when it is not intended by the player.

According to the eighth aspect, the player can give an instruction to start accepting cancellation through an operation different from the operation of changing the position or the orientation of the input device, thereby facilitating the operation of giving the instruction.

According to the ninth and tenth aspects, the player does not need to perform an operation for starting to accept cancellation, whereby it is possible to simplify the player's operation.

These and other features, aspects and advantages of example embodiments of the present invention will become more apparent from the following detailed description of example embodiments of the present invention when taken in conjunction with the accompanying drawings.

DESCRIPTION OF NON-LIMITING EXAMPLE EMBODIMENTS (Configuration Of Game System)

Figure 1:
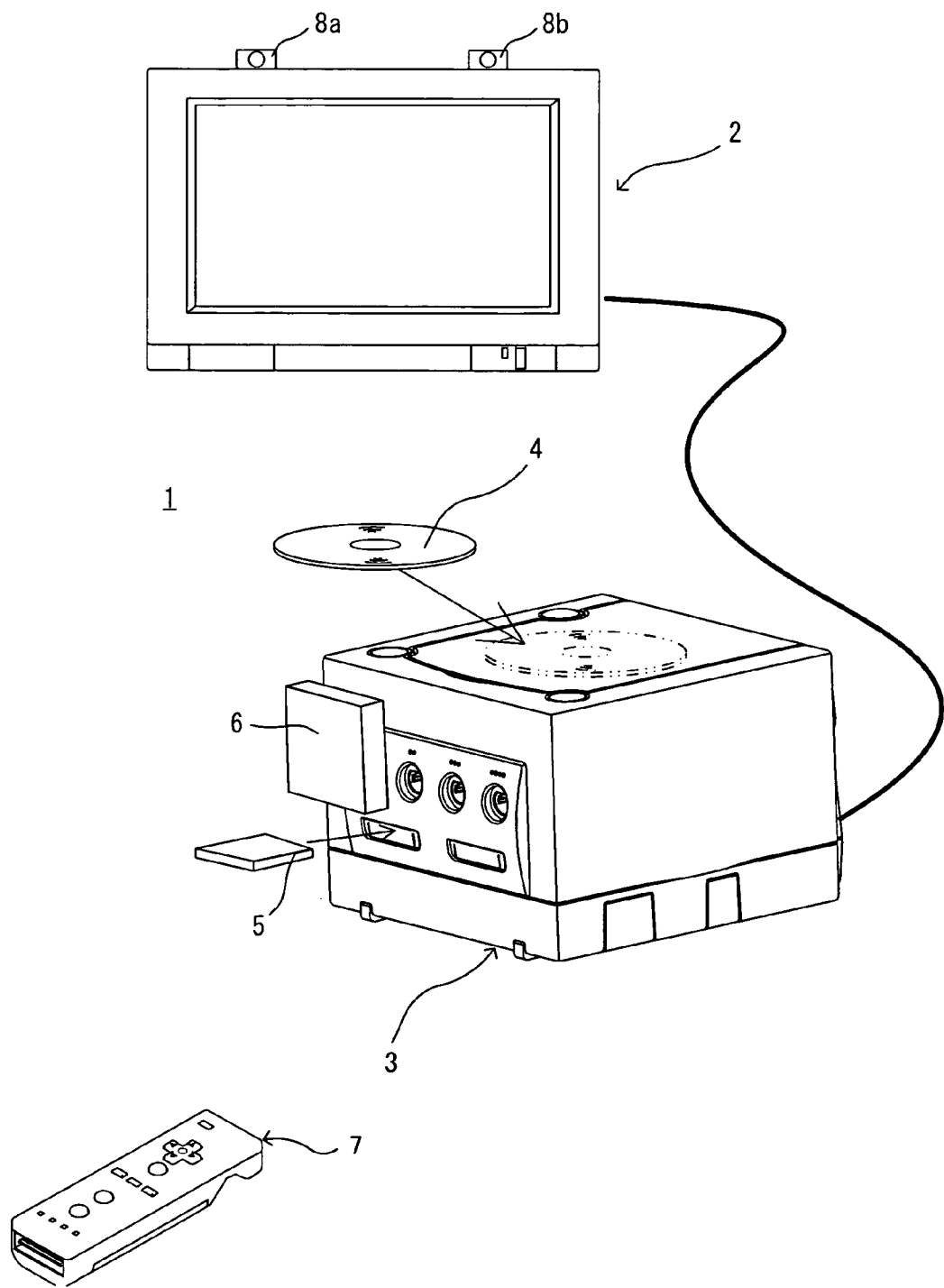
FIG. 1 is an external view showing a video game system including a video game device, being an example of a position calculation device according to an example embodiment of the present invention.

Referring to FIG. 1, a video game system 1 including a video game device according to an example embodiment of the present invention will now be described. FIG. 1 shows an external view of the video game system 1. A home-console type video game device will be described below as an example of the video game device of an example embodiment of the present invention.

Referring to FIG. 1, the video game system 1 includes a home-console type video game device (hereinafter simply "video game device") 3 and a controller 7 for giving control data to the video game device 3. The video game device 3 is connected, via a connection cord, to a display (hereinafter "monitor") 2 provided with a speaker, such as a home television receiver. Two markers 8a and 8b are provided around the monitor 2 (on the upper side of the screen in the illustrated example). Specifically, the markers 8a and 8b are infrared LEDs outputting infrared light to the front side of the monitor 2. A receiver unit 6 is connected to the video game device 3 via a connection terminal. The receiver unit 6 receives control data wirelessly transmitted from the controller 7, and the controller 7 and the video game device 3 are connected via wireless communications. In an alternative embodiment, the controller 7 and the video game device 3 may be connected via a wire. The video game system 3 includes an optical disc 4, being an example of an information storage medium that can be received by the video game device 3. Provided on the upper principal plane of the video game device 3 are an ON/OFF switch for turning ON/OFF the power of the video game device 3, a reset switch for resetting a game process, and an OPEN switch for opening the upper lid of the video game device 3. The lid opens up when the OPEN switch is pressed by the player so that the optical disc 4 can be put in place.

The video game device 3 can also receive an external memory card 5 including a backup memory, or the like, for statically storing save data, or the like. The video game device 3 executes a video game program, or the like, stored in the optical disc 4 to obtain a game image, and displays the obtained game image on the monitor 2. The video game device 3 may reproduce a past game status from save data stored in the external memory card 5 to obtain a game image for that past game status, and display the obtained game image on the monitor 2. Then, the player of the video game device 3 can enjoy the game process by operating the controller 7 while watching the game image displayed on the monitor 2.

The controller 7 wirelessly transmits, from a communications section 36 (to be described later) therein, the control data to the video game device 3, to which the receiver unit 6 is connected, by means of a technique such as Bluetooth (registered trademark), for example. The controller 7 has a control section, including a plurality of control buttons. As will later be apparent, the controller 7 includes an acceleration sensor 37 (to be described later) for detecting the acceleration in at least two orthogonal axial directions. Data representing the acceleration detected by the acceleration sensor 37 is transmitted to the video game device 3 as a part of the control data. The video game device 3 performs a predetermined operation on data representing the acceleration to calculate the inclination (orientation) of the controller 7, and performs processes according to the inclination. The controller 7 includes an image capturing/processing section 35 (to be described later) for capturing an image as viewed from the controller 7. Specifically, the image capturing/processing section 35 takes an image of the markers 8a and 8b provided around the monitor 2. The video game device 3 performs processes according to the position and the orientation of the controller 7 by performing calculations based on the image.

Figure 2:
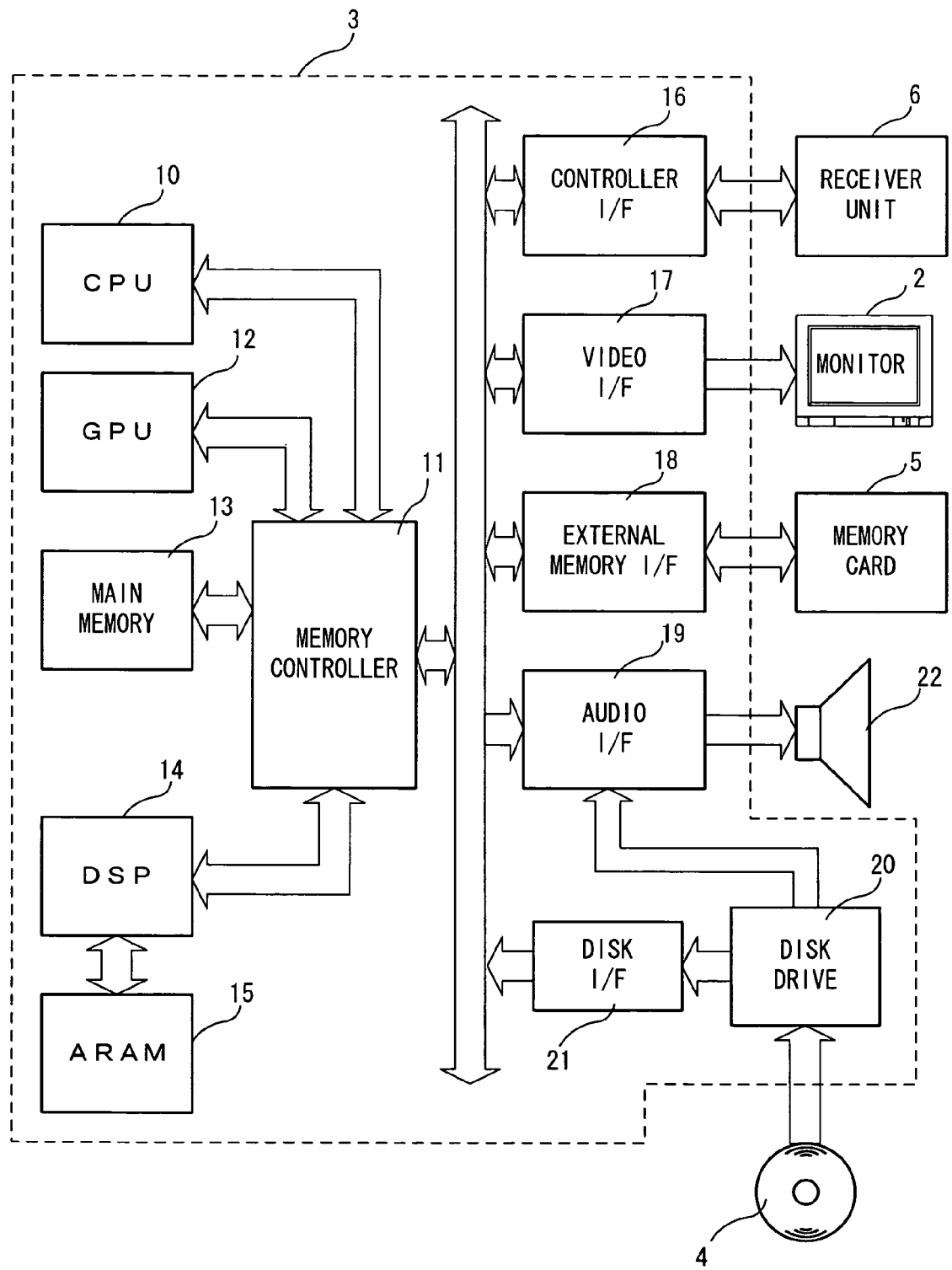
FIG. 2 is a functional block diagram showing a video game device 3.

Referring now to FIG. 2, a configuration of the video game device 3 will be described. FIG. 2 is a functional block diagram showing the video game device 3.

Referring to FIG. 2, the video game device 3 includes a RISC CPU (Central Processing Unit) 10, for example, for executing various programs. The CPU 10 executes a boot program stored in a boot ROM (not shown), thus initializing memory devices, such as a main memory 13, and then executes a video game program stored in the optical disc 4 to perform a game process, etc., according to the video game program. Connected to the CPU 10 via a memory controller 11 are a GPU (Graphics Processing Unit) 12, the main memory 13, a DSP (Digital Signal Processor) 14, and an ARAM (Audio RAM) 15. The memory controller 11 is connected, via a predetermined bus, to a controller I/F (interface) 16, a video I/F 17, an external memory I/F 18, an audio I/F 19 and a disk I/F 21, which are connected to the receiver unit 6, the monitor 2, the external memory card 5, the speaker 22 and a disk drive 20, respectively.

The GPU 12 is responsible for image processing based on instructions from the CPU 10, and is a semiconductor chip, for example, capable of computations necessary for 3D graphics display. The GPU 12 performs the image process by using a memory dedicated for image processing (not shown) or a part of the memory area of the main memory 13. The GPU 12 produces game image data or movie data to be displayed on the monitor 2 using these memory areas, and outputs the produced data to the monitor 2 via the memory controller 11 and the video I/F 17 as necessary.

The main memory 13 is a memory area used by the CPU 10, and stores a video game program, etc., as necessary for processes performed by the CPU 10. For example, the main memory 13 stores the video game program loaded from the optical disc 4 by the CPU 10 and various data, etc. The video game program, the various data, etc., stored in the main memory 13 are executed or processed by the CPU 10.

The DSP 14 is for processing sound data, etc., produced by the CPU 10 when executing the video game program, and is connected to the ARAM 15 for storing the sound data, etc. The ARAM 15 is used when the DSP 14 performs a predetermined process (e.g., storing a video game program, sound data, etc., which have been loaded in advance). The DSP 14 reads out the sound data stored in the ARAM 15, and outputs the sound data through the speaker 22 provided in the monitor 2 via the memory controller 11 and the audio I/F 19.

The memory controller 11 is responsible for the overall control of data transfers, and is connected to the various I/F's described above. The controller I/F 16 includes, for example, four controller I/F portions, each having a connector into which an external unit can be fitted for communicable connection between the external unit and the video game device 3. For example, the receiver unit 6 may be fitted into the connector to be connected to the video game device 3 via the controller I/F 16. As described above, the receiver unit 6 receives control data from the controller 7, and outputs the control data to the CPU 10 via the controller I/F 16. In an alternative embodiment, the video game device 3 may include therein, instead of the receiver unit 6, a receiver module for receiving control data transmitted from the controller 7. In such a case, the transmitted data received by the receiver module is outputted to the CPU 10 via a predetermined bus. The monitor 2 is connected to the video I/F 17. The external memory card 5 is connected to the external memory I/F 18, whereby a backup memory, etc., provided in the external memory card 5 can be accessed. The audio I/F 19 is connected to the speaker 22 provided in the monitor 2 so that the sound data read out from the ARAM 15 by the DSP 14 or the sound data outputted directly from the disk drive 20 can be outputted through the speaker 22. The disk I/F 21 is connected to the disk drive 20. The disk drive 20 reads out data from the optical disc 4 placed in a predetermined read-out position, and outputs the data to the bus or the audio I/F 19 of the video game device 3.

Figure 3A:
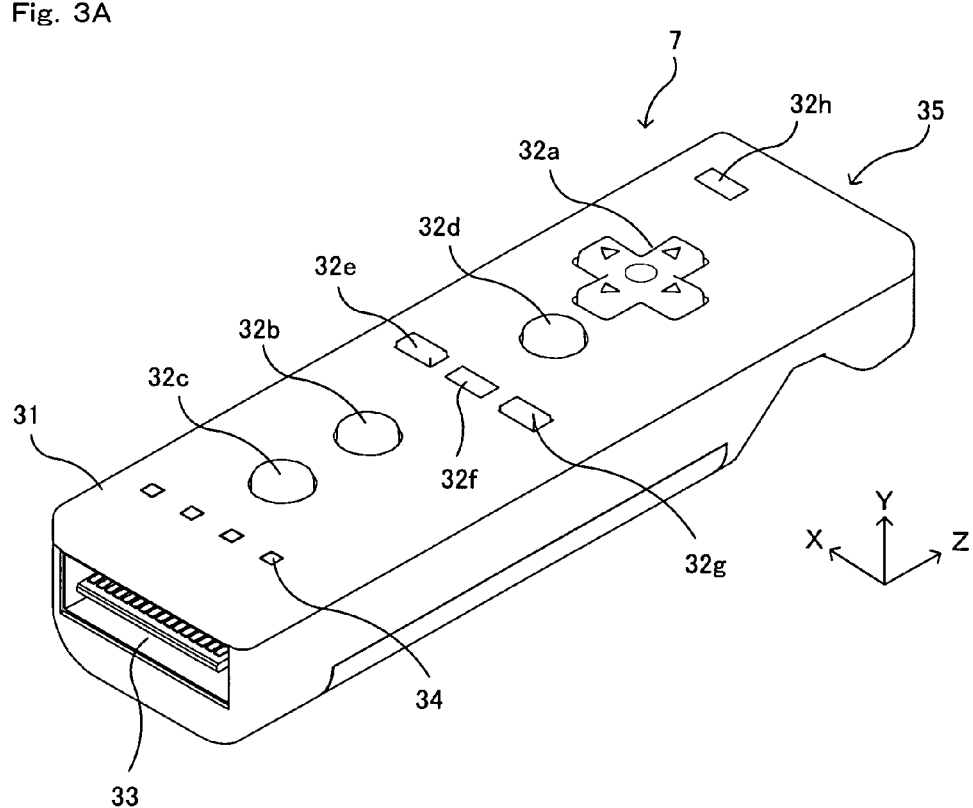
FIG. 3A is a perspective view showing a controller 7.
Figure 3B:
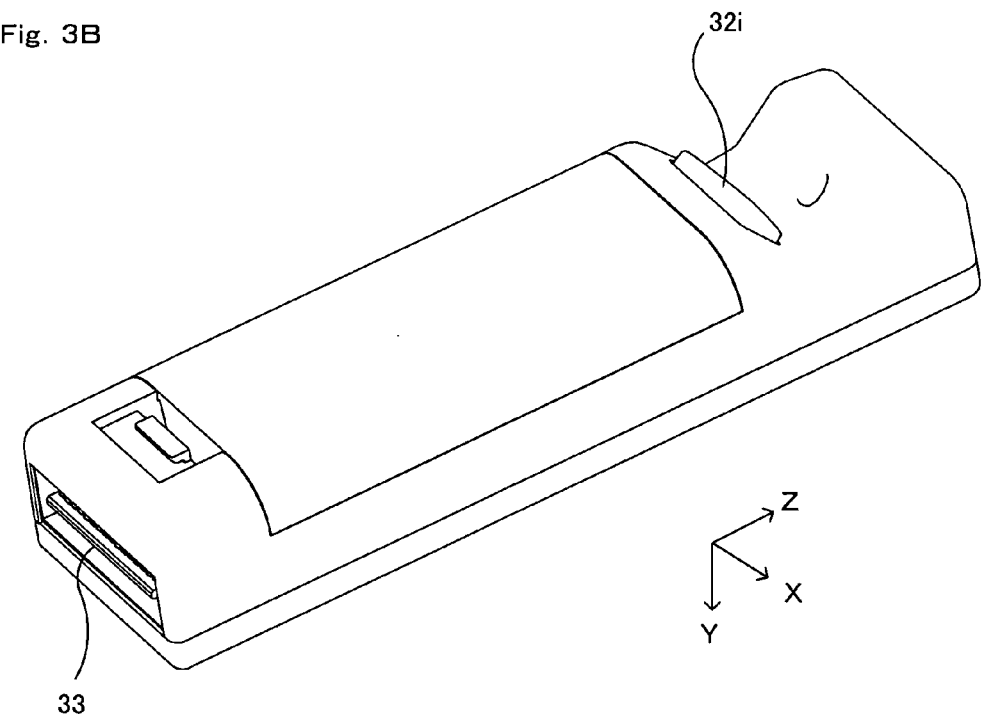
FIG. 3B is a perspective view showing the controller 7.
Figure 4:
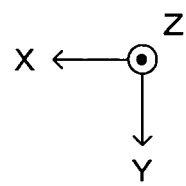
FIG. 4 shows the controller 7 as viewed from the front side.
Figure 4:
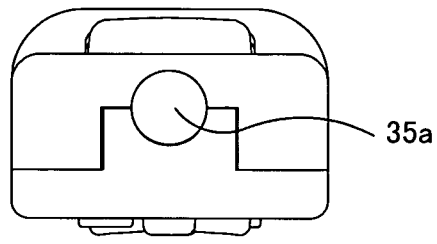

Referring now to FIGS. 3A to 8, the controller 7 will be described. FIGS. 3A to 4 are perspective views showing the external configuration of the controller 7. FIG. 3A is a perspective view showing the controller 7 as viewed from the upper rear side, and FIG. 3B is a perspective view showing the controller 7 as viewed from the lower rear side. FIG. 4 shows the controller 7 as viewed from the front side.

Referring to FIGS. 3A to 4, the controller 7 includes a housing 31 formed by plastic molding, for example. The housing 31 has a generally rectangular parallelepiped shape, with the longitudinal direction being the front-rear direction (the Z-axis direction shown in FIG. 3), and has an overall size such that it can be held in a hand of an adult or a child. The player can use the controller 7 for game operations by pressing buttons provided on the controller 7, changing the inclination (the angle with respect to the direction of gravity) of the controller 7 itself, and changing the position and direction of the controller 7 itself. For example, the player can operate the controlled object in the game space (e.g., a character 51 to be described later) by changing the inclination of the controller 7. The player can operate the controlled object by turning the controller 7 about an axis in the longitudinal direction and changing the position on the screen pointed at by the controller 7. As used herein, "the position on the screen pointed at by the controller 7" is ideally the position at which the straight line extending in the longitudinal direction from the front end of the controller 7 crosses the screen of the monitor 2. However, it does not have to be precisely the position as long as a position in the vicinity thereof can be calculated by the video game device 3. Hereinafter, the position on the screen pointed at by the controller 7 will be referred to as the "position pointed at by the controller 7". Moreover, the longitudinal direction of the controller 7 (the housing 31) may hereinafter be referred to as the "pointing direction of the controller 7".

The housing 31 includes a plurality of control buttons. Provided on the upper surface of the housing 31 are a cross-shaped key 32a, an X button 32b, a Y button 32c, a B button 32d, a select switch 32e, a menu switch 32f and a start switch 32g. A depressed portion is formed on the lower surface of the housing 31, and an A button 32i is provided on a slope on the rear side of the depressed portion. Each of these buttons (switches) is assigned a function as specified in the video game program executed by the video game device 3, the details of which will not be discussed herein as being not directly related to the description of example embodiments of the present invention. A power switch 32h for turning ON/OFF the power of the video game device 3 from a remote position is provided on the upper surface of the housing 31.

Moreover, the controller 7 includes the image capturing/processing section 35 (FIG. 5B), and a light receiving port 35a of the image capturing/processing section 35 is provided on the front side of the housing 31 as shown in FIG. 4. A connector 33 is provided on the rear side of the housing 31. The connector 33 is, for example, a 32-pin edge connector, and may be used for connecting other units to the controller 7. Moreover, a plurality of LEDs 34 are provided on the upper surface of the housing 31 near the rear end. The controller 7 is given a controller ID (number) for identifying the controller 7 from others. The LEDs 34 are used for notifying the player of the controller ID being currently assigned to the controller 7. Specifically, when control data is transmitted from the controller 7 to the video game device 3, one of the LEDs 34 is lit depending on the controller ID.

Figure 5A:
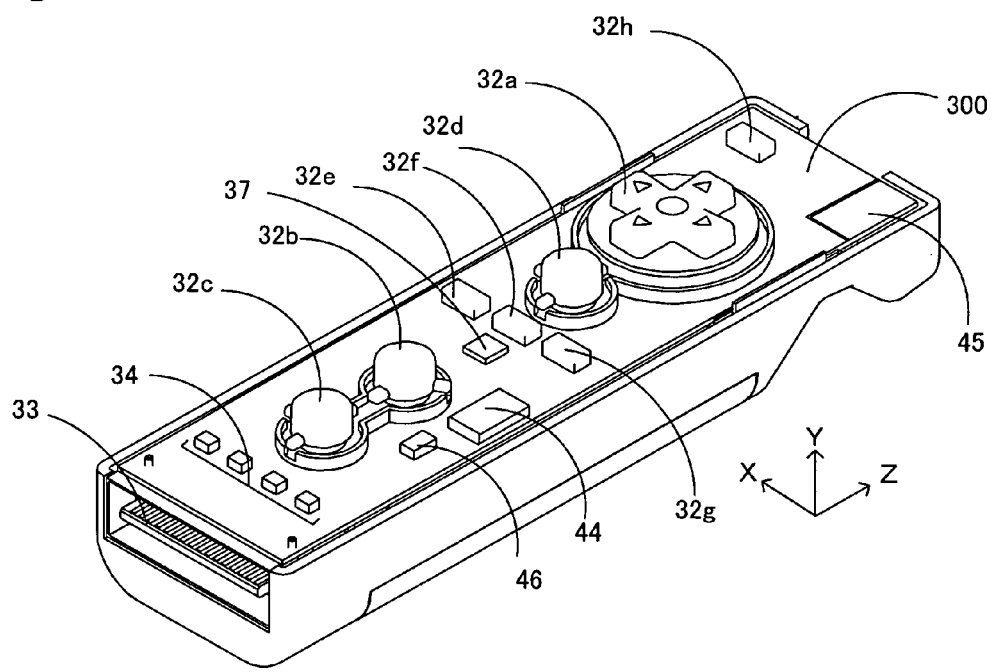
FIG. 5A shows an internal configuration of the controller 7.
Figure 5B:
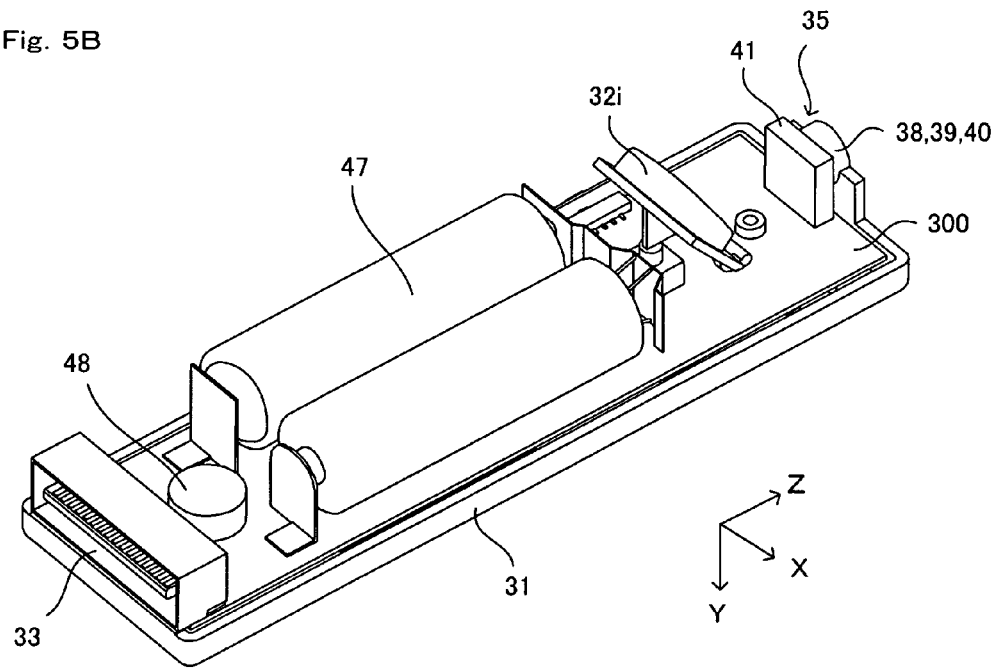
FIG. 5B shows an internal configuration of the controller 7.

Referring now to FIGS. 5A and 5B, an internal configuration of the controller 7 will be described. FIGS. 5A and 5B show an internal configuration of the controller 7. FIG. 5A is a perspective view showing the controller 7 with an upper casing (a part of the housing 31) taken off. FIG. 5B is a perspective view showing the controller 7 with a lower casing (a part of the housing 31) taken off. FIG. 5A shows one side of a substrate 300, and FIG. 5B shows the other side thereof.

In FIG. 5A, the substrate 300 is secured in the housing 31, and the control buttons 32a to 32h, an acceleration sensor 37, the LED 34, a quartz oscillator 46, a wireless module 44, an antenna 45, etc., are provided on the upper principal plane of the substrate 300. These components are connected to a microcomputer 42 (see FIG. 6) via lines (not shown) formed on the substrate 300, etc. With the wireless module 44 and the antenna 45, the controller 7 can function as a wireless controller. The quartz oscillator 46 generates a basic clock for the microcomputer 42.

Referring to FIG. 5B, the image capturing/processing section 35 is provided at the front edge on the lower principal plane of the substrate 300. The image capturing/processing section 35 includes an infrared filter 38, a lens 39, an image sensing device 40 and an image processing circuit 41 provided in this order from the front side of the controller 7, and these components are provided on the lower principal plane of the substrate 300. The connector 33 is provided at the rear edge on the lower principal plane of the substrate 300. The A button 32i is provided on the lower principal plane of the substrate 300 behind the image capturing/processing section 35, and battery cells 47 are accommodated in a position further behind the A button 32i. A vibrator 48 is provided on the lower principal plane of the substrate 300 between the battery cells 47 and the connector 33. The vibrator 48 may be, for example, a vibrating motor or a solenoid. As the vibrator 48 is actuated, the controller 7 is vibrated, and the vibration is transmitted to the hand of the player holding the controller 7, thus realizing a video game with vibration feed back.

Note that the shape of the controller 7, and the shape, number and arrangement of the control buttons shown in FIGS. 3A to 5B are all illustrative, and it is understood that example embodiments of the present invention can be carried out with any other suitable shape, number and arrangement. The position of the image capturing/processing section 35 in the controller 7 (the light receiving port 35a of the image capturing/processing section 35) does not have to be the front side of the housing 31, but may be on any other side as long as light can be received from outside the housing 31. Then, the "pointing direction of the controller 7" is a direction perpendicular to the light receiving port, i.e., the image-capturing direction of the image sensing device 40.

Figure 6:
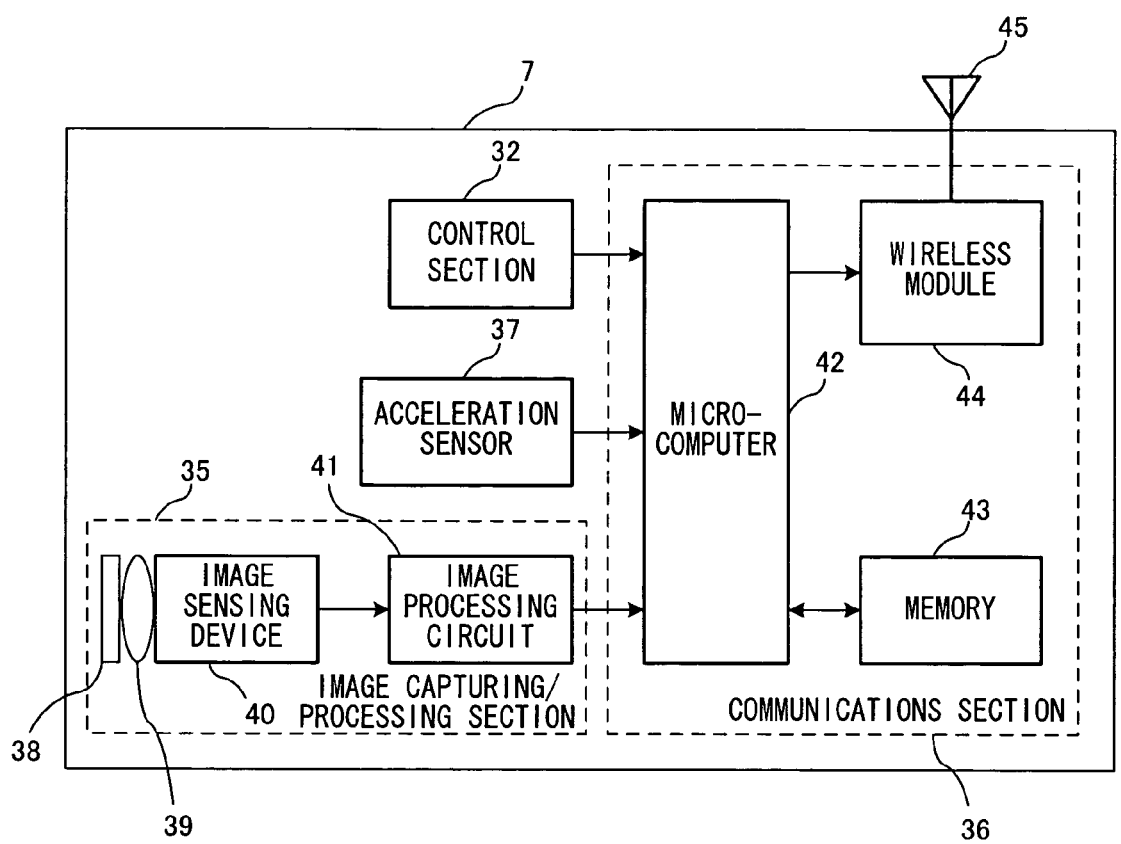
FIG. 6 is a block diagram showing a configuration of the controller 7.
Figure 7:
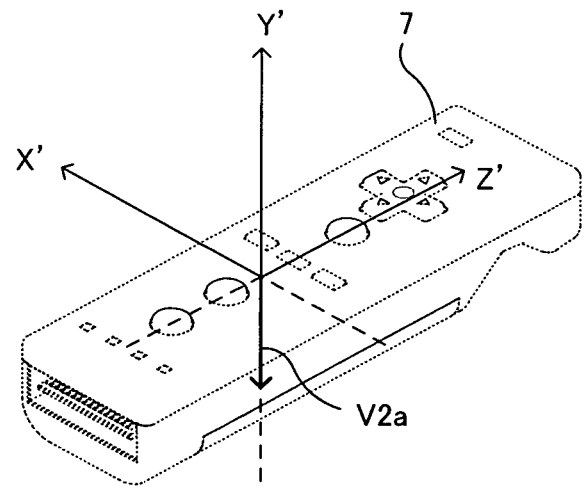
FIG. 7 shows the relationship between the inclination of the controller 7 and the output of the acceleration sensor.
Figure 8:
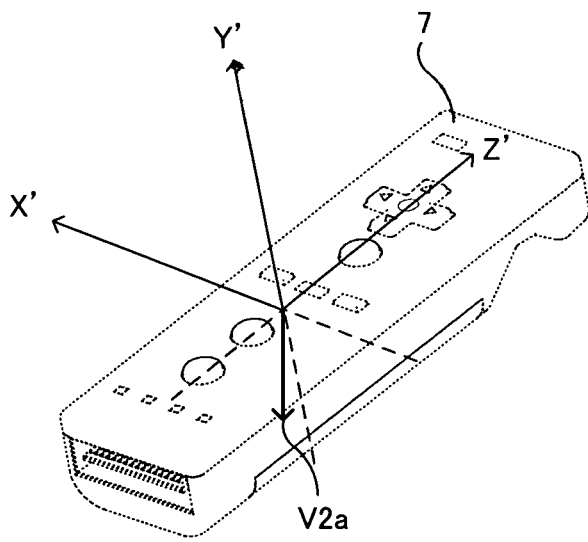
FIG. 8 shows the relationship between the inclination of the controller 7 and the output of the acceleration sensor.

FIG. 6 is a block diagram showing a configuration of the controller 7. The controller 7 includes therein the acceleration sensor 37 mentioned above. The acceleration sensor 37 detects the acceleration (including the gravitational acceleration) of the controller 7, i.e., the force (including the gravity) acting upon the controller 7. Referring now to FIGS. 7 and 8, how acceleration is detected will be described in detail.

FIGS. 7 and 8 show the relationship between the inclination of the controller 7 and the output of the acceleration sensor. The X'Y'Z' coordinate system shown in FIGS. 7 and 8 is a Cartesian coordinate system based on the controller 7, which rotates as the controller 7 is turned and whose origin moves as the controller 7 is moved. The upward direction of the controller 7 is the positive Y'-axis direction, the forward direction is the positive Z'-axis direction, and the leftward direction (when facing forward) is the positive X'-axis direction.

Referring to FIGS. 7 and 8, the acceleration sensor 37 detects the acceleration in each of three axial directions of the up/down direction of the controller 7 (the Y'-axis direction shown in FIG. 7), the left/right direction (the X'-axis direction shown in FIG. 7) and the forward/backward direction (the z'-axis direction shown in FIG. 7). The acceleration sensor 37 detects the linear acceleration along each axis, and the output of the acceleration sensor therefore represents the acceleration value for each axis. Therefore, the detected acceleration is represented as a three-dimensional vector in the X'Y'Z' coordinate system defined based on the controller 7 (see FIGS. 7 and 8).

FIG. 7 shows a state where the gravitational acceleration (the vector Va shown in FIG. 7) is oriented in the downward direction of the controller 7. In FIGS. 7 and 8, it is assumed that the controller 7 is stationary. In the state shown in FIG. 7, the acceleration value (hereinafter the "acceleration vector") Va detected by the acceleration sensor 37 is oriented in the negative Y'-axis direction. Then, in the acceleration vector Va, only the Y' coordinate takes a non-zero value, whereas the X' coordinate and the Z' coordinate are both zero. FIG. 8 shows a state where the controller 7 is inclined so as to be turned about the Z' axis from the position shown in FIG. 7. In the state shown in FIG. 8, the direction of the acceleration vector Va has changed from that shown in FIG. 7, whereby the X' coordinate and the Y' coordinate each take a non-zero value, and the z coordinate is zero since the turn is about the Z' axis. As shown in FIGS. 7 and 8, the acceleration sensor 37 is capable of detecting acceleration values whose components are three axial directions of the controller 7. Then, through software-based operations using computers such as the microcomputer 42 and the CPU 10, operations are performed on the detected acceleration value while handling it as an acceleration vector made up of components of the three axial directions, thus calculating the inclination of the controller 7.

Data (acceleration data) representing the acceleration detected by the acceleration sensor 37 is outputted to the microcomputer 42. In the present embodiment, the acceleration sensor 37 outputs the acceleration-based values repeatedly (specifically, once per frame). The video game device 3 performs predetermined operations on the value while handling the value as an acceleration vector to thereby calculate the inclination (orientation) of the controller 7, and performs a game process according to the inclination.

In the present embodiment, the magnitude of the acceleration detected by the acceleration sensor 37 while the controller 7 is being stationary, i.e., the magnitude of the acceleration detected by the acceleration sensor 37 when it only represents the gravitational acceleration, is 1. For example, the values of the components of the acceleration vector Va detected in the state shown in FIG. 7 are (X',Y', Z')=(0,1,0).

While the acceleration sensor 37 is typically a capacitance-coupling acceleration sensor, it may be an acceleration sensor of any other suitable type or a gyroscope, as long as it is capable of calculating the inclination of the controller 7. While an acceleration sensor detects the linear acceleration along each axis, a gyroscope detects an angular velocity entailing rotation. Therefore, a gyroscope and an acceleration sensor cannot simply be replaced by each other as they detect signals of different natures. In order to calculate the inclination using a gyroscope instead of an acceleration sensor, substantial changes need to be made. Specifically, the value of the inclination is initialized at the beginning of the detection. Then, the angular velocity data outputted from the gyroscope are integrated together. Then, by using the result of integration, the amount of change in the inclination with respect to the initial value is calculated. The calculated inclination is represented in angle.

As already described above, where the inclination is calculated by an acceleration sensor, the inclination is calculated by comparing the value of a component of the gravitational acceleration for each axis with a predetermined reference. Therefore, the calculated inclination can be represented by a vector, and an absolute direction can be detected without initialization. This is a difference between an acceleration sensor and a gyroscope. Moreover, they calculate the inclination in values of different natures, i.e., one being an angle and the other being a vector. Therefore, when an acceleration sensor is replaced by a gyroscope, it is necessary to perform a predetermined conversion on the inclination data.

Referring back to FIG. 6, the controller 7 includes a control section 32 (the control buttons), the image capturing/processing section 35, and the communications section 36, in addition to the acceleration sensor 37.

The image capturing/processing section 35 is a system for analyzing image data obtained by image capturing means to determine each spot with high luminance and then to calculate the centroid, the size, etc., of the spot. The image capturing/processing section 35 has a sampling frequency of about 200 frames per second, for example, and is thus capable of following fast movements of the controller 7.

Figure 9:
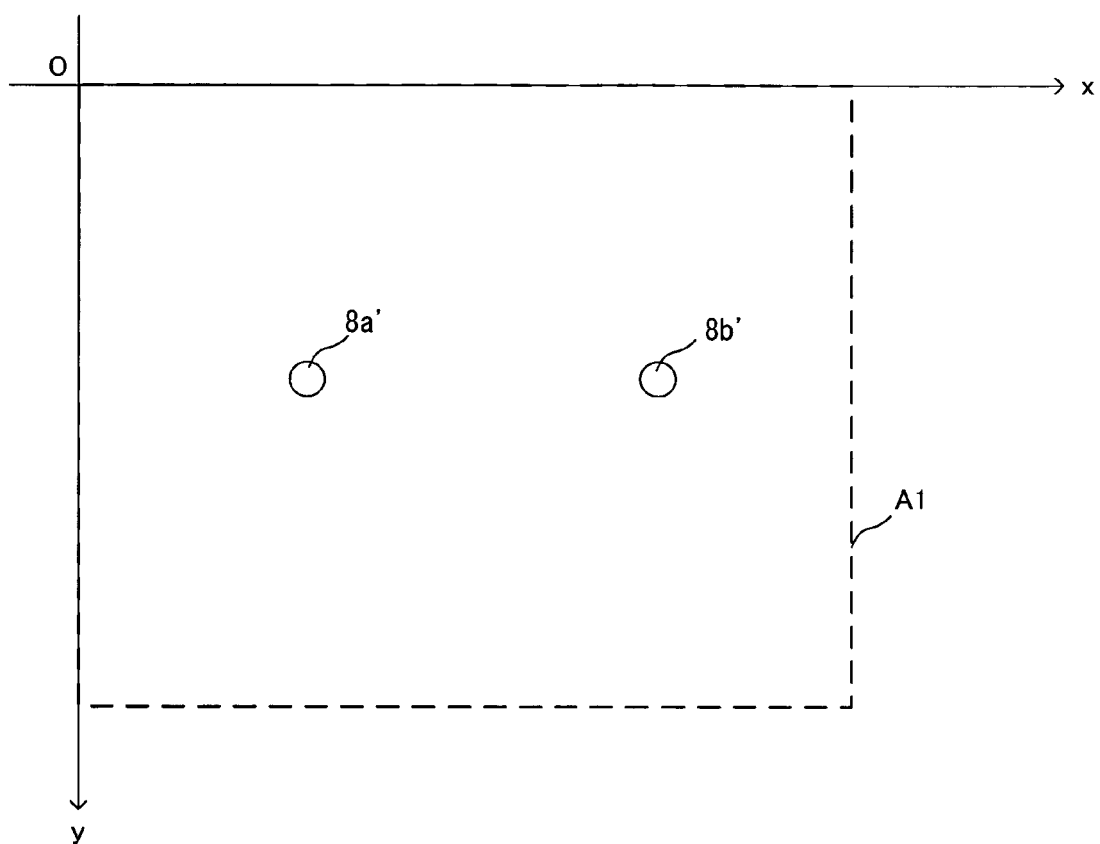
FIG. 9 shows an example of a captured image.

Specifically, the image capturing/processing section 35 includes the infrared filter 38, the lens 39, the image sensing device 40 and the image processing circuit 41. The infrared filter 38 passes only an infrared portion of incident light entering the controller 7 from the front side. The markers 8a and 8b provided around the display screen of the monitor 2 are infrared LEDs outputting infrared light to the front side of the monitor 2. Therefore, with the provision of the infrared filter 38, it is possible to more accurately take the image of the markers 8a and 8b. The lens 39 condenses the infrared light passing through the infrared filter 38, and outputs the condensed infrared light onto the image sensing device 40. The image sensing device 40 is a solid-state image sensing device, such as a CMOS sensor or a CCD, for capturing the infrared light condensed through the lens 39. Therefore, the image sensing device 40 produces image data by capturing only the infrared light that has passed through the infrared filter 38. The image obtained by the image sensing device 40 will hereinafter be referred to as the "captured image". The image data produced by the image sensing device 40 is processed in the image processing circuit 41. The image processing circuit 41 calculates the positions of the imaging targets (the markers 8a and 8b) in the captured image. Referring now to FIG. 9, a method for calculating the position of the imaging target will be described.

FIG. 9 shows an example of a captured image. In the captured image A1 of FIG. 9, an image 8a' of the marker 8a and an image 8b' of the marker 8b are arranged in a left-right arrangement. When the captured image is input, the image processing circuit 41 first calculates the coordinates representing the position of each region in the captured image that satisfies a predetermined condition. The predetermined condition is a condition for identifying the image of the imaging target (the target image). Specifically, the predetermined condition is that the region has a luminance greater than or equal to a predetermined value (a high-luminance region) and the size of the region is within a predetermined range. The predetermined condition is not limited to any particular condition as long as it is for identifying the imaging target, and may include a condition regarding the color of the image in an alternative embodiment.

When calculating the position of the target image, the image processing circuit 41 first identifies a high-luminance region of the captured image as a candidate target image. This is because a target image is present as a high-luminance region in the image data of the captured image. Then, based on the size of the identified high-luminance region, the image processing circuit 41 performs a determination process for determining whether or not the high-luminance region is a target image. In addition to images 8a' and 8b' of the two markers 8a and 8b being target images, the captured image may include images other than the target images, e.g., sunlight coming in through a window or light from a fluorescent light. Then, images other than the images 8a' and 8b' of the markers 8a and 8b may appear as high-luminance regions. The determination process is for accurately identifying target images by distinguishing the images 8a' and 8b' of the markers 8a and 8b being target images from others. Specifically, in this determination process, it is determined whether or not the size of the identified high-luminance region is in a predetermined range. If the size of the high-luminance region is within the predetermined range, it is determined that the high-luminance region represents a target image. If the size of the high-luminance region is not within the predetermined range, it is determined that the high-luminance region represents an image other than the target image.

If a high-luminance region is determined to represent a target image in the determination process, the image processing circuit 41 calculates the position of the high-luminance region. Specifically, the image processing circuit 41 calculates the centroid of the high-luminance region. The centroid can be calculated on a scale finer than the resolution of the image sensing device 40. It is assumed herein that the image taken by the image sensing device 40 has a resolution of 126×96, and the centroid is calculated on a 1024×768 scale. Therefore, the position of the centroid is represented by a set of coordinates ranging from (0,0) to (1024,768). Note that a position in the captured image is represented in a coordinate system (xy coordinate system) where the upper left corner of the captured image is the origin, the downward direction is the positive y-axis direction, and the rightward direction is the positive x-axis direction, as shown in FIG. 9.

As described above, the image processing circuit 41 calculates the coordinates representing the position of each region in the captured image that satisfies a predetermined condition. The position calculated by the image processing circuit 41 may hereinafter be referred to as the "marker position". The marker position is the position of the imaging target in the coordinate system for representing positions on the plane corresponding to the captured image. The image processing circuit 41 outputs the marker position to the microcomputer 42 of the communications section 36. The data of the marker position is transmitted by the microcomputer 42 to the video game device 3 as control data. Since the marker position changes in response to changes in the direction and the position of the controller 7 itself, the video game device 3 can calculate the direction and the position of the controller 7 by using the coordinates of the marker position. In the present embodiment, processes up to the process of calculating the marker position from the captured image are performed by the image processing circuit 41 and/or the microcomputer 42 of the controller 7. Alternatively, the captured image may be sent to the video game device 3, and processes equivalent to the subsequent processes may be performed by the CPU 10 of the video game device 3, etc.

The control section 32 represents the various control buttons 32a to 32i described above, such as the cross-shaped key 32a, and outputs data representing the input status of the control buttons 32a to 32i (whether each of the control buttons 32a to 32i has been pressed) to the microcomputer 42 of the communications section 36.

The communications section 36 includes the microcomputer 42, a memory 43, a wireless module 44 and an antenna 45. The microcomputer 42 controls the wireless module 44 for wirelessly transmitting data obtained by the microcomputer 42 while using the memory 43 as a memory area.

The data outputted from the control section 32, the acceleration sensor 37 and the image capturing/processing section 35 to the microcomputer 42 are temporarily stored in the memory 43. Data are wirelessly transmitted from the communications section 36 to the receiver unit 6 at regular intervals. Since the game process typically proceeds in a cycle of 1/60 second (being one frame), the interval is preferably less than or equal to 1/60 second. At the transmission timing for transmitting data to the receiver unit 6, the microcomputer 42 outputs, as control data, data stored in the memory 43 to the wireless module 44. The wireless module 44 uses a technique such as Bluetooth (registered trademark) to modulate a carrier of a predetermined frequency with the control data, and radiates the weak radio wave signal from the antenna 45. Thus, the control data is modulated by the wireless module 44 into a weak radio wave signal and transmitted from the controller 7. The weak radio wave signal is received by the receiver unit 6 of the video game device 3. The video game device 3 can obtain the control data by demodulating and decoding the received weak radio wave signal. The CPU 10 of the video game device 3 performs the game process based on the obtained control data and the video game program.

By using the controller 7, the player can perform game operations such as changing the inclination of the controller 7, changing the position of the controller 7 itself, and turning the controller 7, in addition to the conventional game operation of pressing control buttons. The game operation using the controller 7 will now be described.

Figure 10:
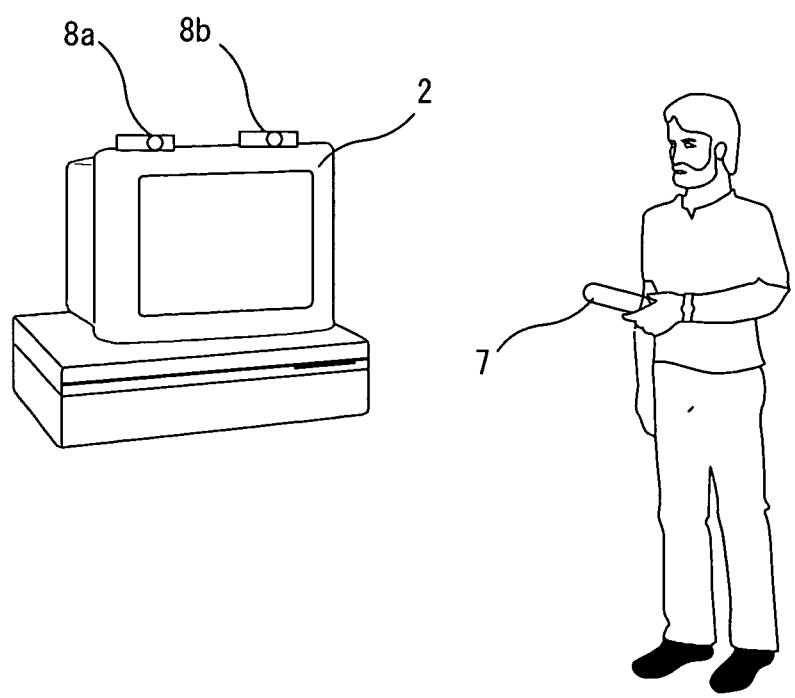
FIG. 10 generally shows how the player uses the controller 7 to perform a game operation.

FIG. 10 generally shows how the player uses the controller 10 to perform a game operation. As shown in FIG. 10, when playing the game on the video game system 1 by using the controller 10, the player holds the controller 10 in one hand. The markers 8a and 8b are arranged along the upper edge of the screen of the monitor 2 in parallel to the horizontal direction of the screen. The positions of the markers 8a and 8b and the direction of the arrangement of the two markers 8a and 8b are not limited to those of the illustrated example. For example, the markers 8a and 8b may be arranged along the lower edge of the screen, or the two markers 8a and 8b may be arranged in the vertical direction of the screen. The player holds the controller 7 with the front side of the controller 7 (the side for receiving light to be sensed by the image capturing/processing section 35) facing toward the markers 8a and 8b. The player performs a game operation by changing the inclination of the controller 7, changing the position on the screen pointed at by the controller 7 (the pointed position), or changing the distance between the controller 7 and the markers 8a and 8b.

(First Example)

A specific example of a video game played by using the video game system 1 will now be described. The first embodiment is a video game in which the game operation is performed by using the output of the acceleration sensor 37 (acceleration vector). In the first embodiment, the data output from the image capturing/processing section 35 is not used in the game operation, and the controller 7 may be a controller not including the image capturing/processing section 35. Then, the markers 8a and 8b provided around the screen of the monitor 2 are not necessary. In the first embodiment, the inclination of the controller 7 with respect to the turn thereof about the Z' axis is calculated. Therefore, the acceleration sensor 37 is only required to detect at least the acceleration in two axial directions, i.e., the X'-axis direction and the Y'-axis direction, among the three axial directions shown in FIG. 7.

Figure 11:
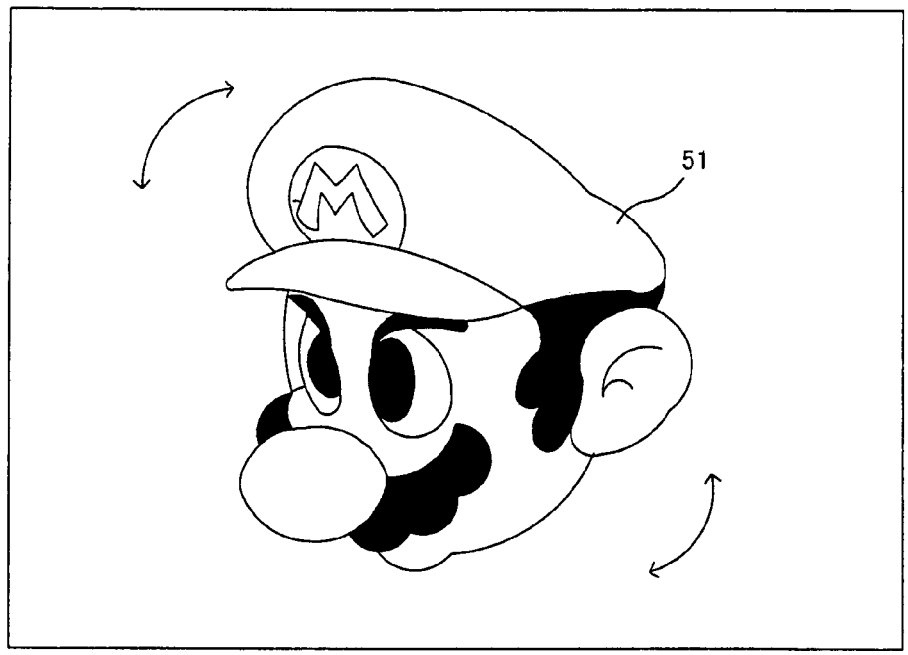
FIG. 11 shows an example of a game image in a first embodiment.

FIG. 11 shows an example of a game image in the first embodiment. The video game of the first embodiment is a video game in which the player turns the character 51 (see arrows in FIG. 11) in a virtual three-dimensional game space (which may be a two-dimensional game space). In the first embodiment, the video game device 3 turns the character 51 about a predetermined axis in the three-dimensional game space in response to the turn of the controller 7 about the Z' axis. Thus, the inclination of the character 51 displayed on the screen of the monitor 2 is determined based on the inclination of the controller 7 in the X'-axis direction and the Y'-axis direction. The game state where a normal game process (the process of turning the character 51 in response to the tilting of the controller 7 in the first embodiment) is being performed is herein referred to as the "non-paused state". In the following description of the first embodiment, "the inclination of the controller 7 in the X'-axis direction and the Y'-axis direction" may be referred to as simply as "the inclination of the controller 7".

Figure 12:
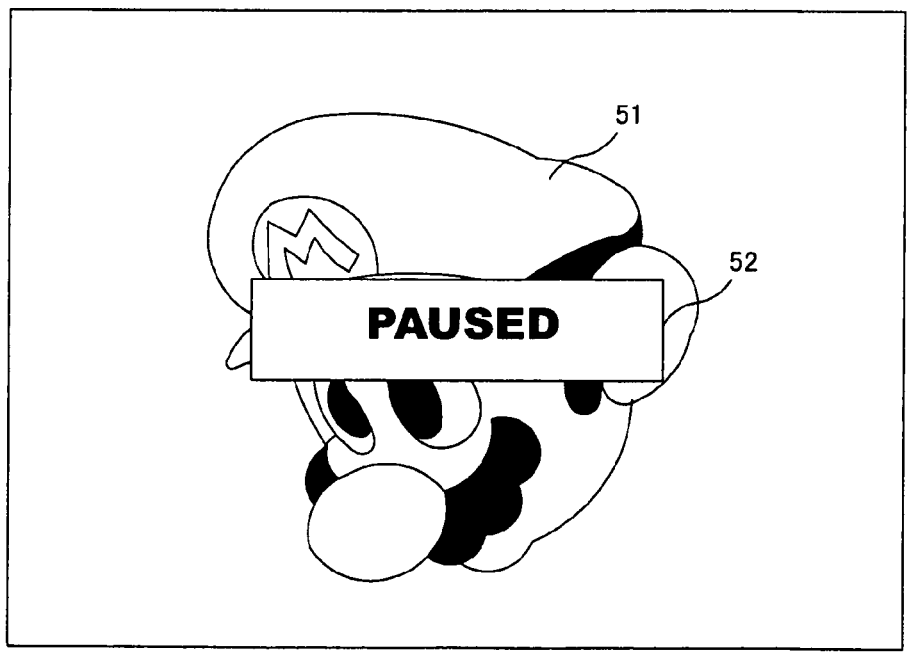
FIG. 12 shows an example of a game image in the paused state.

If the player performs an operation (a pause operation) of pressing the pause button (a button for instructing a pause, e.g., the start switch 32g) in the non-paused state, the video game device 3 pauses the game process, and the game state transitions from the non-paused state to the paused state. The paused state is a state where the game process is being paused and where the period in which the pause-canceling operation is accepted has not started. FIG. 12 shows an example of a game image in the paused state. In the paused state, the game process is being paused and not being performed, and the character 51 is therefore not turned. In the paused state, a pause image 52 is displayed on the screen of the monitor 2. The pause image 52 is an image for notifying the player that the game process is being paused.

Figure 13:
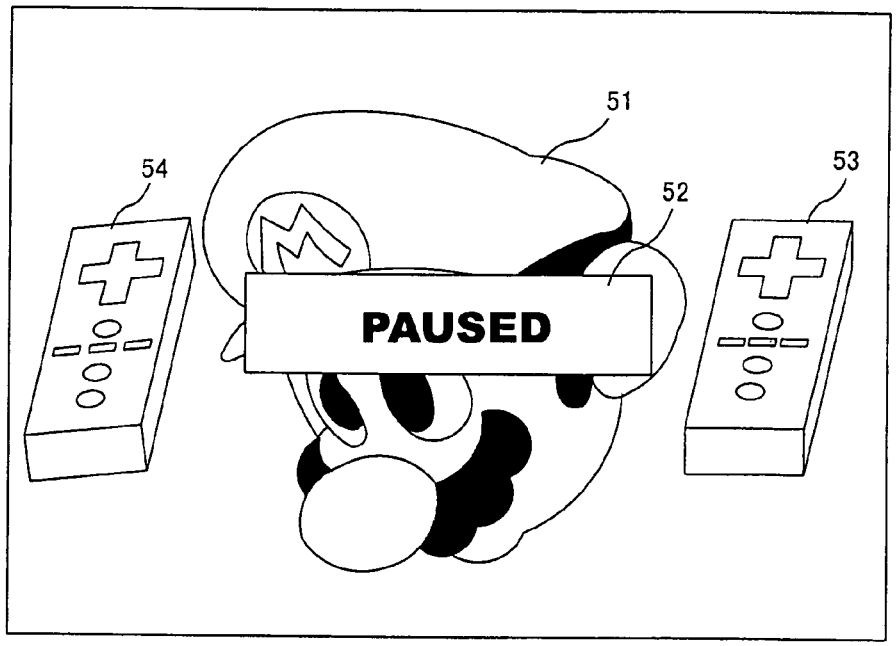
FIG. 13 shows an example of a game image in the cancel-accepting state.

If the player presses a predetermined button (e.g., the select switch 32e) in the paused state, the video game device 3 brings the game state from the paused state to the cancel-accepting state. The cancel-accepting state is a state where the game process is being paused and where the period in which the pause-canceling operation is accepted has started. Thus, the predetermined button is a button for instructing the transition of the game state from the paused state to the cancel-accepting state. The predetermined button will hereinafter be referred to as the "cancel-accepting button". In order to resume the game from the paused state, the player first presses the cancel-accepting button to enter a state where pause cancellation is accepted. FIG. 13 shows an example of a game image in the cancel-accepting state. In the cancel-accepting state, the video game device 3 displays two models 53 and 54 of the controller 7 on the screen of the monitor 2. The first model 53 represents the current state of the controller 7. When the player changes the inclination of the controller 7 in the cancel-accepting state, the video game device 3 accordingly changes the inclination of the first model 53. The second model 54 represents the state of the controller 7 at the time when the game process was paused.

In the cancel-accepting state, the video game device 3 determines whether or not the current inclination of the controller 7 coincides with the inclination at the time of the pause operation (at the time when the game process was paused). In the first embodiment, the video game device 3 determines that the current inclination and the inclination at the pause operation coincide with each other as long as the difference between the two inclinations is smaller than a predetermined reference even if the two inclinations do not completely coincide with each other. If it is determined that the inclinations coincide with each other, the video game device 3 cancels the pause. Therefore, the player, who wishes to resume a game, controls the controller 7 so that the inclination of the controller 7 coincides with the inclination at the time of the pause operation. As described above, in the cancel-accepting state, the models 53 and 54 are displayed, and therefore the player can control the controller 7 while watching the models 53 and 54 so that the inclination of the first model 53 coincides with the inclination of the second model 54.

Figure 14:
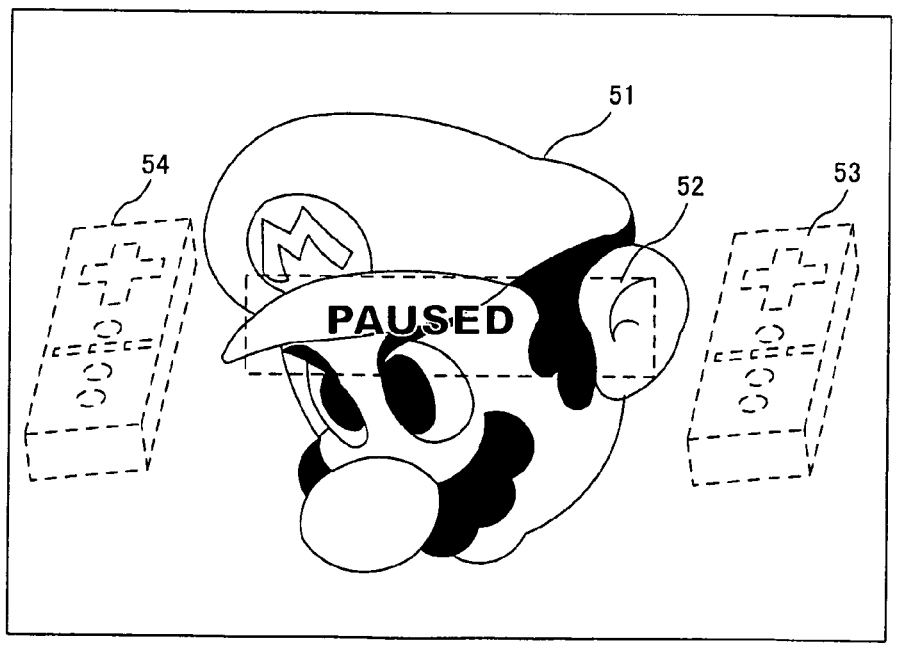
FIG. 14 shows an example of a game image when a pause is canceled.

FIG. 14 shows an example of a game image when the pause is canceled. As shown in FIG. 14, when the pause is canceled, the inclination of the first model 53 and the inclination of the second model 54 generally coincide with each other. When the pause is canceled, the pause image 52 and the models 53 and 54 are erased (no longer displayed on the screen) In FIG. 14, the images being erased is represented by the use of dotted lines. Thus, as the pause is canceled, the game state transitions from the cancel-accepting state to the non-paused state, whereby the game process is resumed. Specifically, the video game device 3 resumes the game process in which the character 51 is turned in response to the tilting of the controller 7.

As described above, in the first embodiment, after the game process is paused by the pause operation, the game process is resumed on the condition that the state of the controller 7 is close enough to that at the time of the pause operation. Thus, the state of the controller 7 when the game process is resumed is generally the same as that at the time of the pause operation. Therefore, it is possible to prevent a situation where the control operation when the pause is canceled is completely different from that at the time of the pause operation. Thus, it is possible to prevent the control operation from being different before and after the pause. For example, in the example shown in FIGS. 11 to 14, it is possible to prevent a situation where the character 51, which is facing downward immediately before the pause, abruptly turns upward (a direction not expected by the player) upon canceling the pause. Being able to keep the state of the controller 7 generally the same before and after the pause is particularly advantageous in a video game that requires precise control operations (see FIG. 27).

In the first embodiment, the player is not allowed to directly cancel the pause in the paused state, but needs to press the cancel-accepting button to first bring the game state to the cancel-accepting state, after which the player is allowed to cancel the pause in the cancel-accepting state. This prevents a situation where the game is resumed when it is not intended by the player. Specifically, it prevents a situation where when the player is not intending to resume the game, the inclination of the controller 7 accidentally coincides with the inclination at the time of the pause operation, thereby inadvertently resuming the game.

Figure 15:
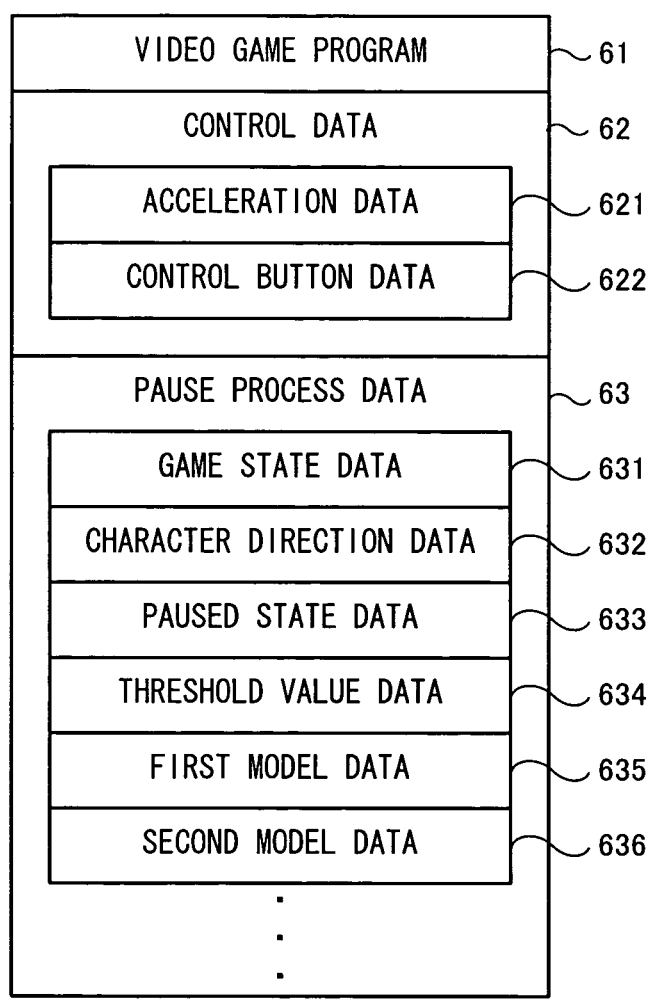
FIG. 15 shows important data to be stored in a main memory 13 of the video game device 3.

A program process performed by the video game device 3 in the first embodiment will now be described. First, important data to be used in the game process will be described with reference to FIG. 15. FIG. 15 shows important data to be stored in the main memory 13 of the video game device 3. Referring to FIG. 15, the main memory 13 stores a video game program 61, control data 62, pause process data 63, etc. In addition to those shown in FIG. 15, the main memory 13 also stores other data necessary for the game process, such as image data of the character 51 to be in the game, and data representing various parameters of the character 51.

At an appropriate point in time after the power of the video game device 3 is turned ON, part or whole of the video game program 61 is loaded from the optical disc 4 and stored in the main memory 13. The video game program 61 includes a program needed for performing processes such as the game process of turning the character 51 according to the inclination of the controller 7.

The control data 62 is transmitted from the controller 7 to the video game device 3, and is stored in the main memory 13. The control data 62 includes acceleration data 621 and control button data 622. The acceleration data 621 is data representing the acceleration detected by the acceleration sensor 37. Herein, the acceleration data 621 is data representing an acceleration vector for the three axial directions of X', Y' and Z' shown in FIG. 7. The control button data 622 is data representing the input status of each of the control buttons 32a to 32i (whether the button has been pressed).

The pause process data 63 is data to be used when pausing the game process (to be described later) and when canceling the pause. The pause process data 63 includes game state data 631, character direction data 632, paused state data 633, threshold value data 634, first model data 635, and second model data 636.

The game state data 631 is data representing the current game state. As described above, in the present embodiment, there are three game states, i.e., "paused state", "non-paused state" and "cancel-accepting state". The game state data 631 indicates one of "paused state", "non-paused state" and "cancel-accepting state".

The character direction data 632 represents the direction (in the game space) of the character 51 being controlled by the player. Specifically, the character direction data 632 is three-dimensional vector data representing a direction in the three-dimensional game space.

The paused state data 633 represents the state of the controller 7 at the time when the game process is paused. In the first embodiment, the state of the controller 7 means the state of the controller 7 regarding the inclination thereof. Therefore, the paused state data 633 represents the acceleration vector at the point in time when the game process was paused.

The threshold value data 634 represents a threshold value to be used in the determination process performed in the cancel-accepting state, i.e., the determination process of determining whether or not the current inclination of the controller 7 coincides with the inclination at the time of the pause operation. The threshold value may be a predetermined fixed value specified in the video game program 61, or a variable value determined by a player's instruction or based on other conditions.

The first model data 635 is data representing the direction of the first model. The second model data 636 is data representing the direction of the first model. As is the character direction data 632, each of the model data 635 and 636 is three-dimensional vector data representing a direction in the three-dimensional game space.

Figure 16:
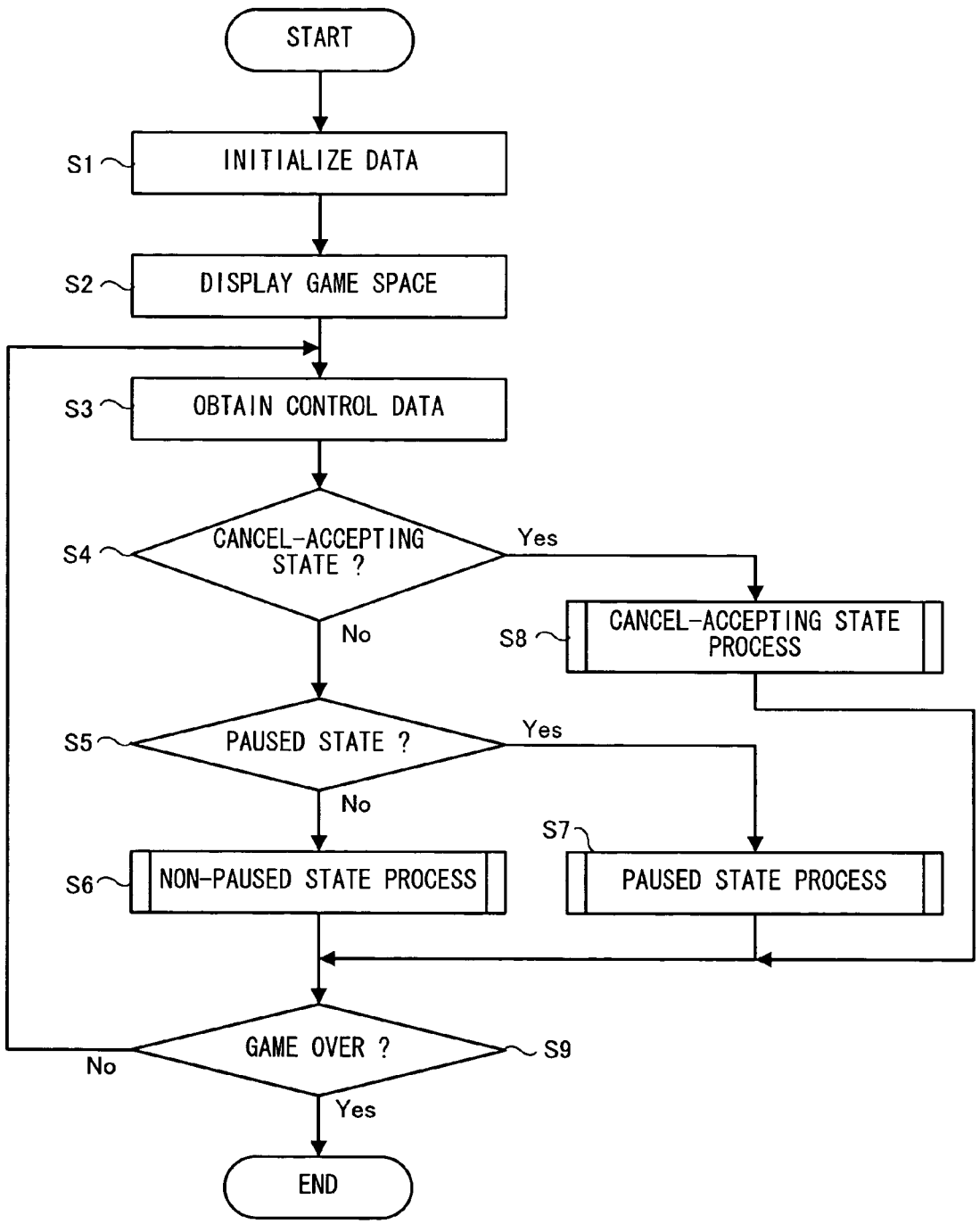
FIG. 16 is a main flow chart showing the process performed by the video game device 3.

Referring now to FIGS. 16 to 19, the details of the process performed by the video game device 3 will be described. FIG. 16 is a main flow chart showing the process performed by the video game device 3. When the power of the video game device 3 is turned ON, the CPU 10 of the video game device 3 executes a boot program stored in a boot ROM (not shown), thus initializing various units such as the main memory 13. The video game program stored in the optical disc 4 is loaded to the main memory 13, and the CPU 10 starts executing the video game program. The flow chart of FIG. 16 shows the process performed after the completion of the process described above. In the flow chart of FIG. 16, parts of the process performed by the video game device 3 for pausing a game and for canceling the pause are shown in detail, and other parts of the game process that are not directly related to example embodiments of the present invention will not be shown in detail.

First, in step S1, data to be used in subsequent processes are initialized. Specifically, data representing the non-paused state is stored in the main memory 13 as the game state data 631. Data representing a predetermined value specified in the video game program 61 is stored in the main memory 13 as the threshold value data 634.

Then, in step S2, a game space is created and displayed on the monitor 2. For example, the CPU 10 creates a three-dimensional game space, and places the character 51 to be present in the game space at a predetermined initial position. A game image representing the created game space, and the produced game image is displayed on the monitor 2. Thereafter, the game proceeds as the loop through steps S3 to S9 is iterated once per frame.

In step S3, the CPU 10 obtains control data from the controller 7. Specifically, the controller 7 transmits control data to the video game device 3 at a predetermined time interval (e.g., an interval of one frame), and the CPU 10 stores the transmitted control data in the main memory 13. The control data at least includes the acceleration data and the control button data. The CPU 10 stores the acceleration data and the control button data in the main memory 13. In the present embodiment, step S2 is performed every frame, whereby the video game device 3 can successively obtain the acceleration data and the control button data.

Then, in step S4, the CPU 10 determines whether or not the current game state is the cancel-accepting state. The determination of step S4 is performed by referring to the game state data 631 stored in the main memory 13. Specifically, the determination result of step S4 is positive if the game state data 631 represents the cancel-accepting state, and the determination result of step S4 is negative if the game state data 631 represents a state other than the cancel-accepting state. If the determination result of step S4 is positive, the process proceeds to step S8 to be described later. If the determination result of step S4 is negative, the process proceeds to step S5.

In step S5, the CPU 10 determines whether or not the current game state is the paused state. The determination of step S5 is performed by referring to the game state data 631 stored in the main memory 13. Specifically, the determination result of step S5 is positive if the game state data 631 represents the paused state, and the determination result of step S5 is negative if the game state data 631 represents a state other than the paused state. If the determination result of step S5 is positive, the process proceeds to step S7 to be described later. If the determination result of step S5 is negative, the process proceeds to step S6. From the start of a game until the pause button is first pressed, the determination result is negative both in steps S4 and S5, whereby the process proceeds to step S6.

Figure 17:
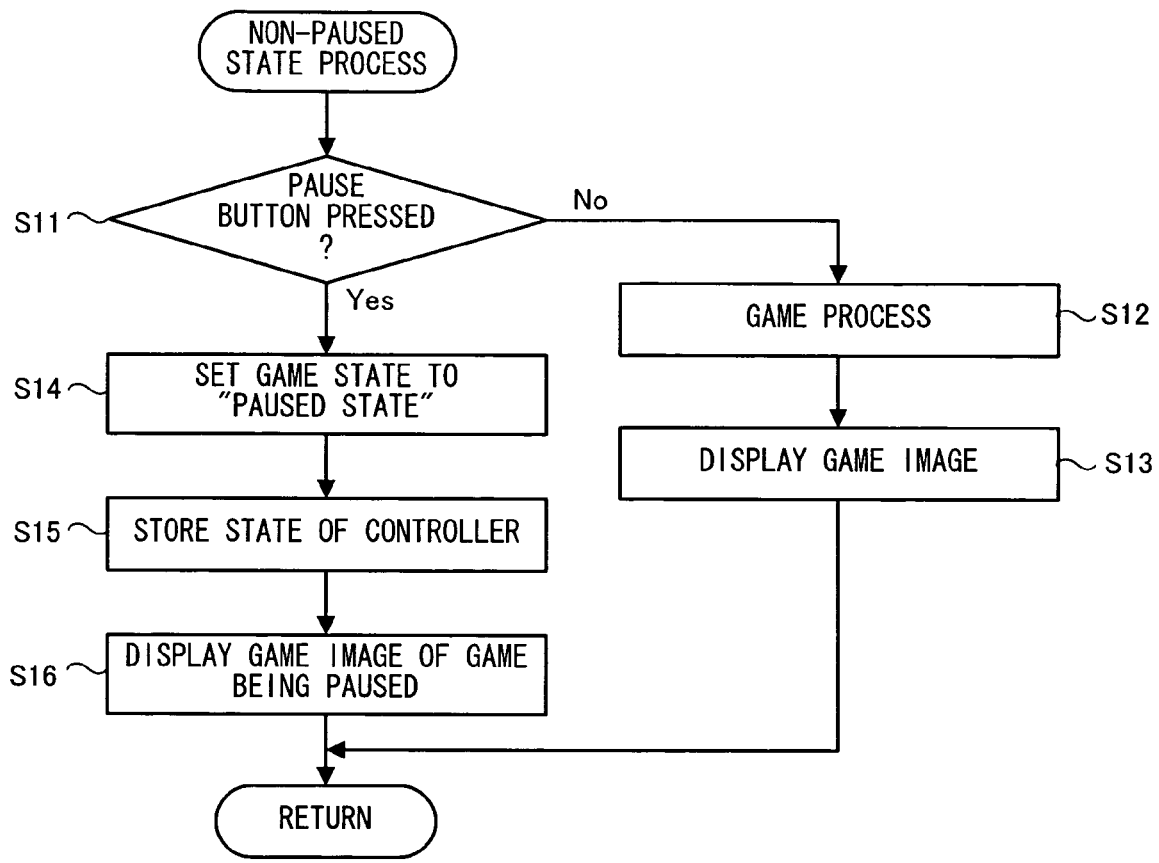
FIG. 17 is a flow chart showing the details of the non-paused state process (step S6) shown in FIG. 16.

In step S6, the non-paused state process is performed. The non-paused state process is a process for performing a normal game process (the process of turning the character 51 in response to the tilting of the controller 7 in the present embodiment). Referring now to FIG. 17, the details of the non-paused state process will be described.

FIG. 17 is a flow chart showing the details of the non-paused state process (step S6) shown in FIG. 16. First, in step S11 of the non-paused state process, the CPU 10 determines whether or not the pause button (the start switch 32g in the first embodiment) has been pressed. The determination of step S11 is performed by referring to the control button data 622 stored in the main memory 13. Specifically, the determination result of step S11 is positive if the control button data 622 indicates that the start switch 32g has been pressed, and the determination result of step S11 is negative if the control button data 622 indicates that the start switch 32g has not been pressed. If the determination result of step S11 is positive, the process proceeds to step S14 to be described later. If the determination result of step S11 is negative, the process proceeds to step S12.

While the non-paused state continues, the determination result of step S11 is negative, and the process therefore proceeds to steps S12 and S13. If the pause button is pressed in the non-paused state, the determination result of step S11 becomes positive, and the process therefore proceeds to steps S14 to S16.

In step S12, the game process is performed, by which the game proceeds. In the first embodiment, the game process is a process of turning the character 51 in response to the tilting of the controller 7. Specifically, the CPU 10 determines the direction of the character 51 in the game space based on the direction of the acceleration vector represented by the acceleration data 621 stored in the main memory 13. The method for calculating the direction of the character 51 is not limited to any particular method. For example, there may be a one-to-one correspondence between the direction of the acceleration vector and the direction of the character 51. For example, the angle by which the character 51 is to be turned may be determined based on the amount of change in the acceleration vector (the difference between the acceleration vector in the current frame and the acceleration vector in the previous frame). Data representing the determined direction of the character 51 is stored as the character direction data 632 in the main memory 13.

Then, in step S13, the CPU 10 produces a game image according to the processing results from step S12 and displays the produced game image on the monitor 2 (FIG. 11). Thus, an image of the character 51 is displayed on the monitor 2, wherein the character 51 is facing in the direction as determined in step S12. After step S13, the CPU 10 exits the non-paused state process.

In step S14, the game state is set to the paused state. Specifically, the CPU 10 updates the game state data 631 stored in the main memory 13 with a value representing the paused state. Therefore, in the next frame (the next iteration of steps S3 to S9), the determination result of step S4 is negative and the determination result of step S5 is positive, and the process therefore proceeds to step S7. Thus, the game process of steps S12 and S13 is not performed, which means that the game process is being paused as a result of step S14.

Then, in step S15, the state of the controller 7 (the inclination of the controller 7 in the first embodiment) is stored. In the first embodiment, the CPU 10 stores data representing the current acceleration vector, i.e., the acceleration data 621 obtained in step S3, in the main memory 13 as the paused state data 633. The data stored in step S15 is not limited to any particular data as long as it represents the state of the controller 7 regarding the inclination thereof. For example, in step S15, data representing the direction of the character 51 may be calculated by a method similar to that of step S12, and stored in the main memory 13 as the paused state data 633. For example, intermediate data obtained during the process of calculating the character direction data from the acceleration vector may be stored in the main memory 13 as the paused state data 633.

Then, in step S16, the CPU 10 displays the game image of the game being paused on the monitor 2. Specifically, the game image at the time when the game process was paused is displayed on the monitor 2 with the pause image 52 superimposed thereon (see FIG. 12). The game image at the time when the game process was paused is the game image displayed in step S13 in the previous frame. After step S16, the CPU 10 exits the non-paused state process.

As described above, when the player presses the pause button in the non-paused state (FIG. 11), the video game device 3 brings the game state to the paused state (step S14), and displays the game image of the game being paused on the monitor 2 (step S16, see FIG. 12). Then, the video game device 3 stores the state of the controller 7 regarding the inclination thereof at the point in time when the game process is paused (step S15).

Figure 18:
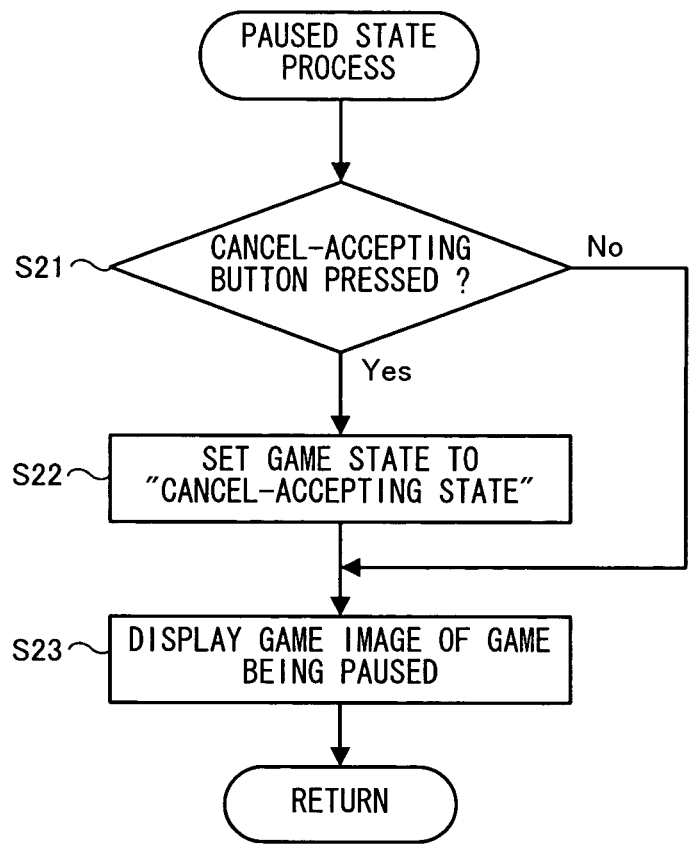
FIG. 18 is a flow chart showing the details of the paused state process (step S7) shown in FIG. 16.

The process to be performed in the paused state will now be described. FIG. 18 is a flow chart showing the details of the paused state process (step S7) shown in FIG. 16. First, in step S21 of the paused state process, the CPU 10 determines whether or not the cancel-accepting button (the select switch 32e in the present embodiment) has been pressed. The determination of step S21 is performed by referring to the control button data 622 stored in the main memory 13. Specifically, the determination result of step S21 is positive if the control button data 622 indicates that the select switch 32e has been pressed, and the determination result of step S21 is negative if the control button data 622 indicates that the select switch 32e has not been pressed. If the determination result of step S21 is positive, the process proceeds to step S22 to be described later. If the determination result of step S21 is negative, the process proceeds to step S23, skipping step S22.

While the cancel-accepting button is the select switch 32e, a different button from the pause button (the start switch 32g) in the first embodiment, the cancel-accepting button and the pause button may be the same button in an alternative embodiment.

In step S22, the game state is set to the cancel-accepting state. Specifically, the CPU 10 updates the game state data 631 stored in the main memory 13 with a value representing the cancel-accepting state. Therefore, in the next frame (the next iteration of steps S3 to S9), the determination result of step S4 is positive, and the process therefore proceeds to step S8.

In step S23, the CPU 10 displays the game image of the game being paused on the monitor 2. Specifically, the game image at the time when the game process was paused is displayed on the monitor 2 with the pause image 52 superimposed thereon (see FIG. 12). After step S23, the CPU 10 exits the paused state process.

Figure 19:
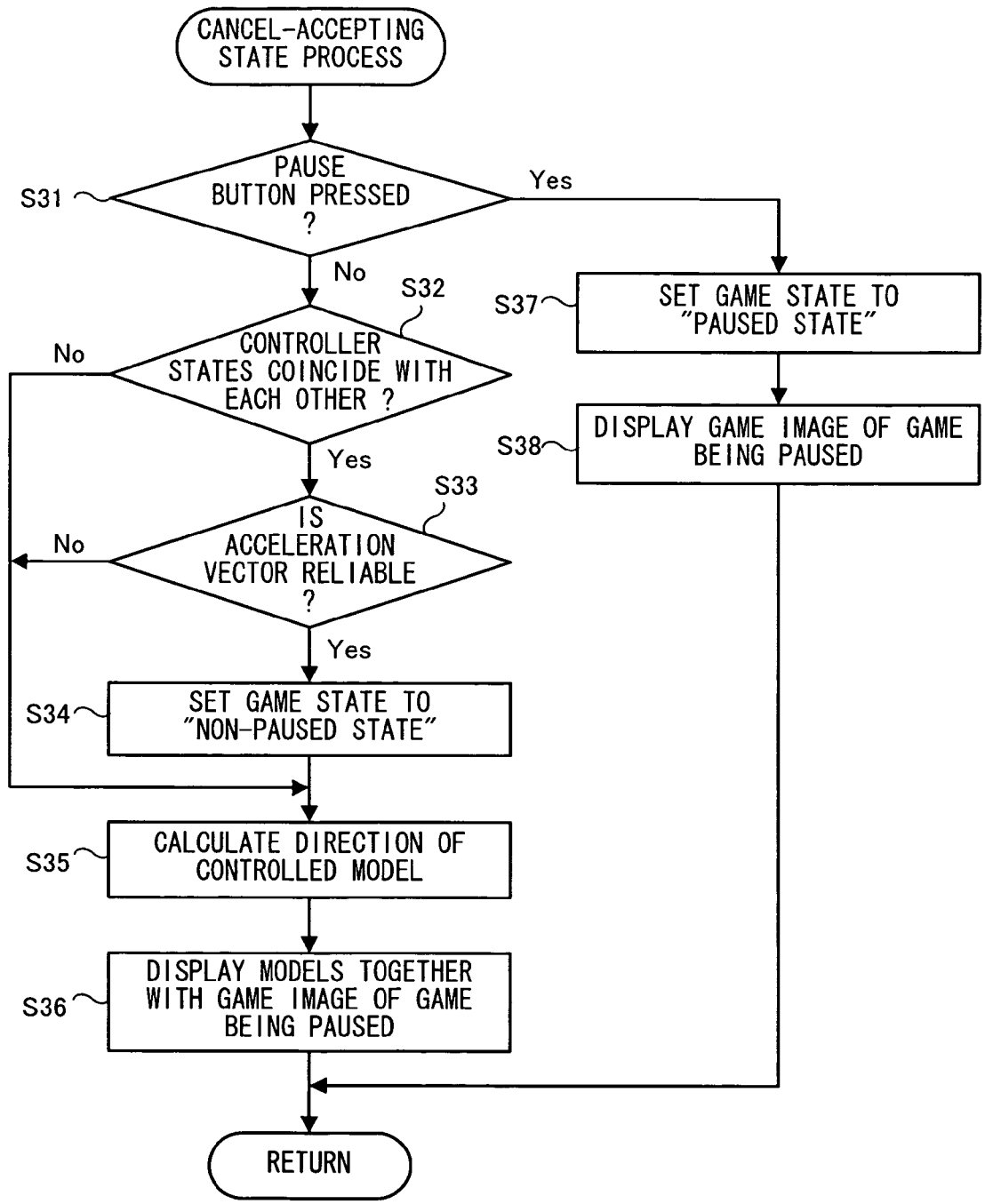
FIG. 19 is a flow chart showing the details of the cancel-accepting state process (step S8) shown in FIG. 16.

The process to be performed in the cancel-accepting state will now be described. FIG. 19 is a flow chart showing the details of the cancel-accepting state process (step S8) shown in FIG. 16. As described above, if the cancel-accepting button is pressed in the paused state (Yes in step S21), the game state transitions to the cancel-accepting state (step S22), and the cancel-accepting state process is performed in the next frame.

First, in step S31 of the cancel-accepting state process, the CPU 10 determines whether or not the pause button (the start switch 32g in the first embodiment) has been pressed. The determination of step S31 is the same as step S11. If the determination result of step S31 is positive, the process proceeds to step S37 to be described later. If the determination result of step S31 is negative, the process proceeds to step S32.

In step S32, the CPU 10 compares the current state (inclination) of the controller 7 with the state (inclination) of the controller 7 at the time of the pause operation to determine whether or not they coincide with each other. The current inclination of the controller 7 is represented by the acceleration data 621 stored in the main memory 13. The inclination of the controller 7 at the time of the pause operation is represented by the paused state data 633 stored in the main memory 13. Thus, the CPU 10 compares the inclination represented by the acceleration data 621 with the inclination represented by the paused state data 633. As described above, in the first embodiment, it is determined that the two inclinations coincide with each other as long as they are close enough to each other even though they do not completely coincide with each other.

Specifically, the CPU 10 calculates the magnitude of the difference between the vector represented by the acceleration data 621 and the vector represented by the paused state data 633 (i.e., the distance between the end points of the two vectors). Then, it is determined whether or not the magnitude is smaller than a predetermined threshold value. The threshold value is represented by the threshold value data 634 stored in the main memory 13. If the magnitude of the difference is smaller than the threshold value, it is determined that the current inclination of the controller 7 and the inclination at the time of the pause operation coincide with each other. If the magnitude of the difference is greater than or equal to the threshold value, it is determined that the current inclination of the controller 7 and the inclination at the time of the pause operation do not coincide with each other.

The method for determining whether or not the current inclination of the controller 7 and the inclination at the time of the pause operation coincide with each other is not limited to the above method of calculating the magnitude of the difference. For example, it may be a method in which it is determined that the current inclination of the controller 7 and the inclination at the time of the pause operation coincide with each other if the angle between the two vectors is smaller than a predetermined value, whereas it is determined that the current inclination of the controller 7 and the inclination at the time of the pause operation do not coincide with each other if the angle is greater than or equal to the predetermined value.

If it is determined in step S32 that the current inclination of the controller 7 and the inclination at the time of the pause operation coincide with each other, the process proceeds to step S33. If it is determined that the current inclination of the controller 7 and the inclination at the time of the pause operation do not coincide with each other, the process proceeds to step S35, skipping steps S33 and S34.

In step S33, the CPU 10 determines whether or not the current acceleration vector is reliable. Herein, "an acceleration vector being reliable" means that the acceleration vector accurately represents the inclination of the controller 7, i.e., the acceleration vector represents only the gravitational acceleration. When the controller 7 is being stationary, the acceleration sensor 37 used in the present embodiment represents only the gravitational acceleration, whereby the inclination of the controller 7 is accurately represented by the acceleration vector. When the controller 7 is being moved by the player, the acceleration sensor 37 detects an acceleration including not only the gravitational acceleration but also an acceleration caused by an inertial force being applied to the controller 7. When such an acceleration is detected, the acceleration vector does not accurately represent the inclination of the controller 7.

In the present embodiment, the CPU 10 determines whether or not the acceleration vector is reliable based on the magnitude of the acceleration vector. Specifically, it is determined that the acceleration vector is reliable if the magnitude of the acceleration vector is close to the magnitude of the gravitational acceleration (i.e., 1), and not reliable if the magnitude of the acceleration vector is not close to the magnitude of the gravitational acceleration. The determination of whether or not the magnitude of the acceleration vector is close to the magnitude of the gravitational acceleration can be performed based on whether the absolute value of the difference between the magnitude of the acceleration vector and the magnitude of the gravitational acceleration is smaller or larger than a predetermined value.

When the controller 7 is being moved by the player, the acceleration vector includes the component of the gravitational acceleration and the component of the acceleration caused by the inertial force being applied to the controller 7, whereby the magnitude of the acceleration vector and the magnitude of the gravitational acceleration may differ substantially from each other. Therefore, the determination of step S33 can be performed accurately by determining whether or not the acceleration vector is reliable based on the magnitude of the acceleration vector.

In an alternative embodiment, the determination of whether or not the acceleration vector is reliable may be performed based on the amount of change in the acceleration vector (or the direction of the acceleration vector). Specifically, the amount of change in the acceleration vector obtained in the current frame from the acceleration vector obtained in the previous frame may be calculated, and it may be determined that the acceleration vector is reliable if the amount of change is smaller than a predetermined amount.

If it is determined in step S33 that the acceleration vector is reliable, the process proceeds to step S34. If it is determined that the acceleration vector is not reliable, the process proceeds to step S35, skipping step S34. In an alternative embodiment, the process may be proceeded to step S34 only when the acceleration vector is determined to be reliable over a certain period of time (e.g., over a number of frames).

In step S34, the game state is set to the non-paused state. Specifically, the CPU 10 updates the game state data 631 stored in the main memory 13 with a value representing the non-paused state. Therefore, in the next frame (the next iteration of steps S3 to S9), the determination result of step S4 and the determination result of step S5 are both negative, and the process therefore proceeds to step S6. Therefore, in the next frame (unless the pause button is pressed again), the game process of steps S12 and S13 is performed. Thus, the pause is canceled in step S34 to resume the game process.

In step S35, the direction of each of the models 53 and 54 in the game space is calculated. The direction of each of the models 53 and 54 is calculated based on the acceleration vector by a method similar to that for calculating the direction of the character 51. The direction of the first model 53 representing the current inclination of the controller 7 is calculated based on the current acceleration vector, i.e., the acceleration vector represented by the acceleration data 621 stored in the main memory 13. The direction of the second model 54 representing the inclination of the controller 7 at the time of the pause operation is calculated based on the acceleration vector at the time of the pause operation, i.e., the acceleration vector represented by the paused state data 633 stored in the main memory 13.

Then, in step S36, the CPU 10 displays the models 53 and 54, in addition to the game image of the game being paused, on the monitor 2 (see FIG. 13). The game image of the game being paused is the game image displayed in step S16. Thus, in the present embodiment, the models 53 and 54 are displayed in the cancel-accepting state. Therefore, the player can control the inclination of the controller 7 while referring to the models 53 and 54 so that the direction of the first model 53 and the direction of the second model 54 coincide with each other. Thus, the operation of canceling the pause is simplified. After step S36, the CPU 10 exits the cancel-accepting state process.

In step S37, the game state is set to the paused state. The specific process of step S37 is the same as step S14 shown in FIG. 17. As a result of step S37, the determination result of step S4 is negative and the determination result of step S5 is positive in the next frame (the next iteration of steps S3 to S9), and the process therefore proceeds to step S7. This means that the game state has transitioned to the paused state. As described above, in the present embodiment, if the pause button is pressed in the cancel-accepting state, the game state returns back to the paused state.

Then, in step S38, the CPU 10 displays the game image of the game being paused on the monitor 2 (see FIG. 12). The specific process of step S38 is the same as step S23 shown in FIG. 18. After step S38, the CPU 10 exits the cancel-accepting state process.

As described above, in the cancel-accepting state, the current inclination of the controller 7 and the inclination of the controller 7 at the time of the pause operation are compared with each other to determine whether or not they coincide with each other (step S32). If they coincide with each other, the game state transitions to the non-paused state (step S34), thereby resuming the game.

Referring back to FIG. 16, the process proceeds to step S9 after step S6, S7 or S8. Then, in step S9, the CPU 10 determines whether or not the game is over. The determination of step S9 is based on, for example, whether the player has completed the game or whether a time limit has elapsed in a case where such a time limit is set in the game. If the determination result of step S9 is negative, the process returns to step S3 to repeat the loop through steps S3 to S9 until it is determined that the game is over. If it is determined that the determination result of step S9 is positive, the CPU 10 exits the process shown in FIG. 16. The process performed by the video game device 3 is as described above.

As described above, in the first embodiment, when the game process is paused, the inclination (acceleration vector) of the controller 7 at the time of the pause operation is stored. Then, the current inclination of the controller 7 and the inclination of the controller 7 at the time of the pause operation are compared with each other, and the pause is canceled when the two inclinations coincide with each other. Thus, it is possible to ensure that when the pause is canceled to resume the game, the inclination of the controller 7 is the same as that before the game was paused. Therefore, in the first embodiment, it is possible to prevent a mistake by the player due to a sudden change in the game operation before and after a pause, thus improving the controllability.

In an alternative embodiment, the game process may be paused after the pause button is pressed only if the state of the controller 7 at the time of the pause operation is a state that can easily be reproduced by the player. If the state of the controller 7 at the time of the pause operation is a state that cannot easily be reproduced by the player, it will be difficult for the player to cancel the pause. A state of the controller 7 at the time of the pause operation that can easily be reproduced by the player is, for example, a state where the controller 7 is not being moved quickly. Whether or not the controller 7 is being moved quickly can be determined based on whether or not the magnitude of the acceleration vector, being the output of the acceleration sensor, is close to the magnitude of the gravitational acceleration.

(Second Embodiment)

The second embodiment is a video game in which the game operation is performed by using the output of the image capturing/processing section 35 (the marker position). In the second embodiment, the acceleration vector data outputted from the acceleration sensor 37 is not used in the game operation, and therefore the controller 7 may not include the acceleration sensor 37.

Figure 20:
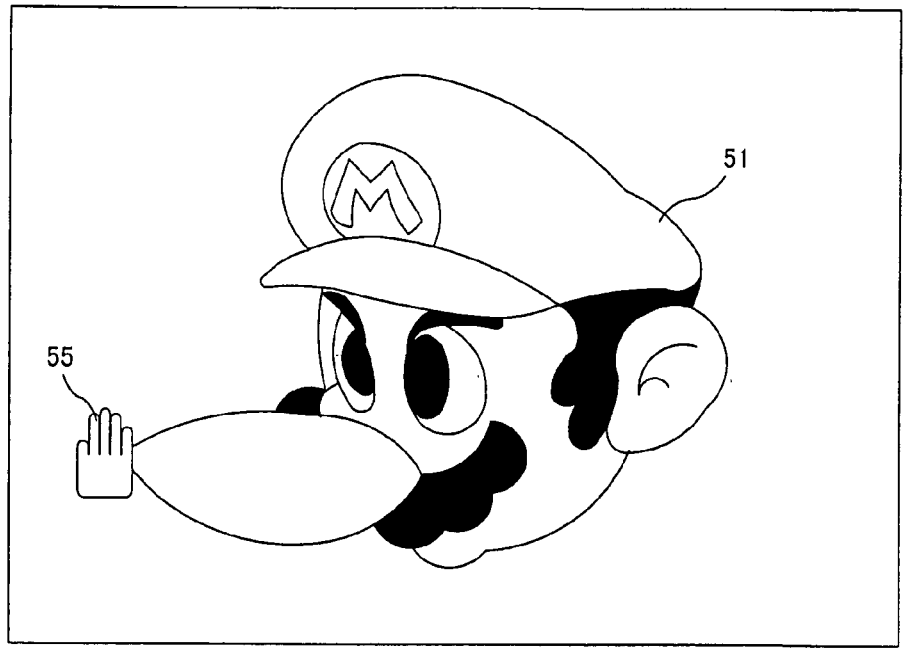
FIG. 20 shows an example of a game image in a second embodiment.

FIG. 20 shows an example of a game image in the second embodiment. The video game of the second embodiment is a video game in which the player operates a cursor 55 displayed on the screen so as to deform the character 51 provided in a virtual two-dimensional (or three-dimensional) game space. In the second embodiment, the video game device 3 moves the cursor 55 on the screen based on the position pointed at by the controller 7 (the position on the screen being pointed at by the controller 7). Thus, the position of the cursor 55 on the screen is determined based on the pointed position. The cursor 55 will hereinafter be referred to as the first cursor 55, as distinguished from a cursor 56 to be described later.

In the second embodiment, a normal game process is performed in the non-paused state, wherein the first cursor 55 is moved as the position pointed at by the controller 7 is changed, and the character 51 is deformed according to the position of the first cursor 55. Specifically, in the non-paused state, the video game device 3 calculates the position pointed at by the controller 7 based on the marker position data contained in the control data transmitted from the controller 7. Then, the first cursor 55 is moved to the pointed position calculated, and the character 51 is deformed according to the position of the first cursor 55. In the example shown in FIG. 20, the nose of the character 51 is deformed according to the position of the first cursor 55. Specifically, the first cursor 55 is located near the left end of the screen and, accordingly, the nose of the character 51 is deformed by being stretched leftward. In an alternative embodiment, the player may be allowed to deform any portion of the character 51 by first specifying the portion of character 51 (e.g., by moving the first cursor 55 to the intended position and pressing the B button 32*d* of the controller 7).

Figure 21:
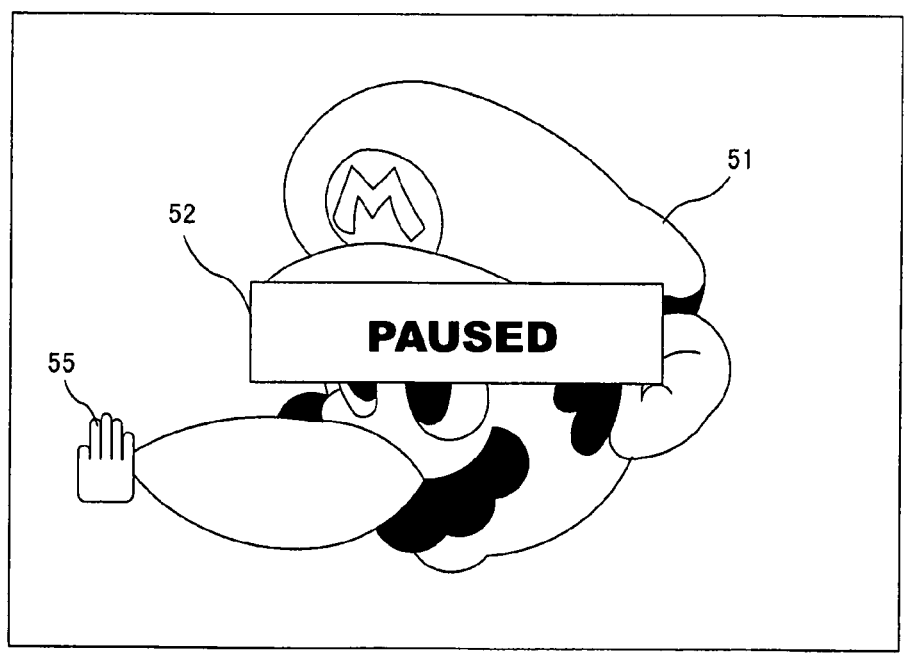
FIG. 21 shows an example of a game image in the paused state in the second embodiment.

When the pause operation, in which the player presses the pause button (e.g., the start switch 32*g*), is performed in the non-paused state, the video game device 3 pauses the game process and brings the game state from the non-paused state to the paused state. FIG. 21 shows an example of a game image in the paused state in the second embodiment. In the paused state, the game process is paused and the game process is not performed, whereby the first cursor 55 is not moved and fixed at the position where it was at the time of the pause operation. As in the first embodiment, the pause image 52 is displayed on the screen of the monitor 2 in the paused state.

Figure 22:
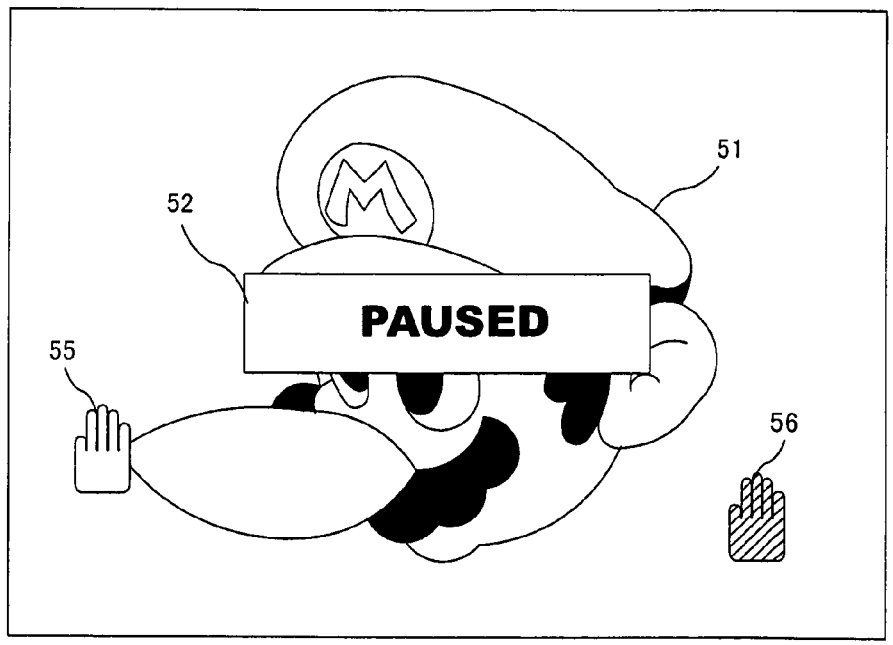
FIG. 22 shows an example of a game image in the cancel-accepting state in the second embodiment.

If the player presses the cancel-accepting button (e.g., the select switch 32*e*) in the paused state, the video game device 3 transitions the game state from the paused state to the cancel-accepting state. Thus, as in the first embodiment, in order to resume the game from the paused state, the player first presses the cancel-accepting button. FIG. 22 shows an example of the game image in the cancel-accepting state in the second embodiment. In the cancel-accepting state, the video game device 3 displays the second cursor 56, different from the first cursor 55, on the screen of the monitor 2. The second cursor 56 represents the position being currently pointed at by the controller 7.

In the cancel-accepting state, the video game device 3 determines whether or not the position being currently pointed at by the controller 7 coincides with the pointed position at the time of the pause operation. In the second embodiment, the video game device 3 determines that the current pointed position and the pointed position at the time of the pause coincide with each other as long as the two positions are close enough to each other even though they do not completely coincide with each other. If it is determined that the positions coincide with each other, the video game device 3 cancels the pause. Therefore, the player, who wishes to resume a game, controls the controller 7 so that the position pointed at by the controller 7 coincides with the pointed position at the time of the pause operation. As described above, in the cancel-accepting state, the two cursors 55 and 56 are displayed, and therefore the player can control the controller 7 while watching the cursors 55 and 56 so that the position of the second cursor 56 coincides with the position of the first cursor 55.

Figure 23:
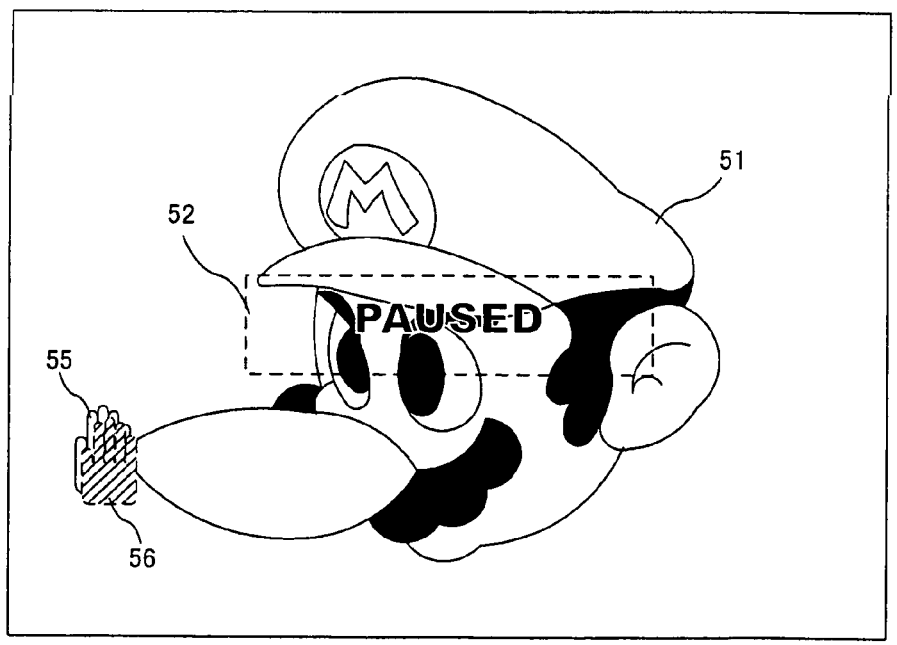
FIG. 23 shows an example of a game image when a pause is canceled in the second embodiment.

FIG. 23 shows an example of a game image when a pause is canceled in the second embodiment. Referring to FIG. 23, at the point in time when the pause is canceled, the position of the first cursor 55 and the position of the second cursor 56 substantially coincide with each other. When the pause is canceled, the pause image 52 and the second cursor 56 are erased (no longer displayed on the screen). In FIG. 23, the images being erased is represented by the use of dotted lines. Thus, as the pause is canceled, the game state transitions from the cancel-accepting state to the non-paused state, whereby the game process is resumed. Thus, the video game device 3 performs the process of moving the first cursor 55 as the position pointed at by the controller 7 is changed and deforming the character 51 according to the position of the first cursor 55.

As described above, in the second embodiment, as in the first embodiment, after the game process is paused by the pause operation, the game process is resumed on the condition that the state of the controller 7 is close to the state at the time of the pause operation. Therefore, it is possible to prevent a situation where the control operation when the pause is canceled is completely different from that at the time of the pause operation. Thus, it is possible to prevent the control operation from being different before and after the pause.

In the second embodiment, the game process is performed using the position pointed at by the controller 7. The position pointed at by the controller 7 changes according to the position and the orientation of the controller 7, and can be said to be information representing the state of the controller 7 regarding the position and the orientation thereof. Thus, in the second embodiment, the state of the controller 7 regarding the position and/or the orientation thereof is calculated by the image capturing/processing section 35, and the calculated result is used in the game process. The example embodiment of the present invention is applicable to a case where the state of the controller 7 is calculated by the image capturing/processing section 35, as in the second embodiment.

Figure 24:
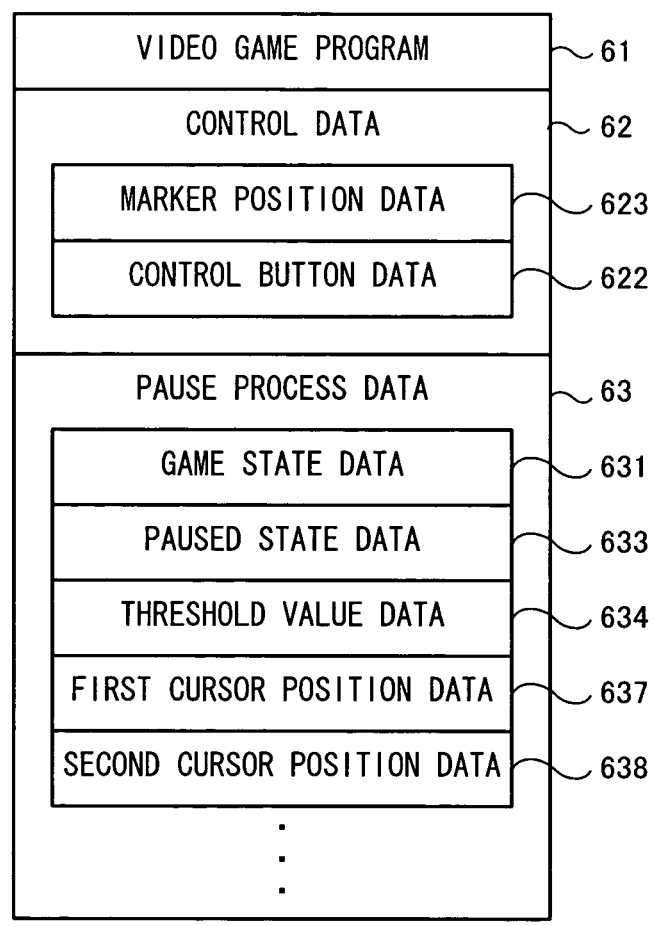
FIG. 24 shows important data to be stored in the main memory 13 of the video game device 3 in the second embodiment.

A program process performed by the video game device 3 in the second embodiment will now be described. First, important data to be used in the game process will be described with reference to FIG. 24. FIG. 24 shows important data to be stored in the main memory 13 of the video game device 3 in the second embodiment. In FIG. 24, like data to those shown in FIG. 15 are denoted by like reference numerals and will not be further described below. Referring now to FIG. 24, the second embodiment will be described while focusing on what is different from the first embodiment.

Referring to FIG. 24, the main memory 13 stores the video game program 61, the control data 62, the pause process data 63, etc., as in the first embodiment. In the second embodiment, the control data 62 includes marker position data 623 and the control button data 622.

The marker position data 623 is data representing the position calculated by the image processing circuit 41 of the image capturing/processing section 35, i.e., the marker position. The marker position is represented by a coordinate system for representing positions on the plane corresponding to the captured image (the xy coordinate system shown in FIG. 9).

In the second embodiment, the pause process data 63 includes the game state data 631, the paused state data 633, the threshold value data 634, first cursor position data 637, and second cursor position data 638.

The first cursor position data 637 is data representing the position of the first cursor 55 on the screen. The second cursor position data 638 is data representing the position of the second cursor 56 on the screen.

As in the first embodiment, the paused state data 633 represents the state of the controller 7 at the point in time when the game process was paused. In the second embodiment, the state of the controller 7 refers to the state of the controller 7 regarding the position pointed at by the controller 7. Therefore, in the second embodiment, the first cursor position data 637 at the point in time when the game process was paused is stored as the paused state data 633.

The threshold value data 634 used in the second embodiment is data used for the same purpose as the threshold value data used in the first embodiment. Note however that the specific value of the threshold value data 634 in the second embodiment may differ from the value of the threshold value data in the first embodiment.

Figure 25:
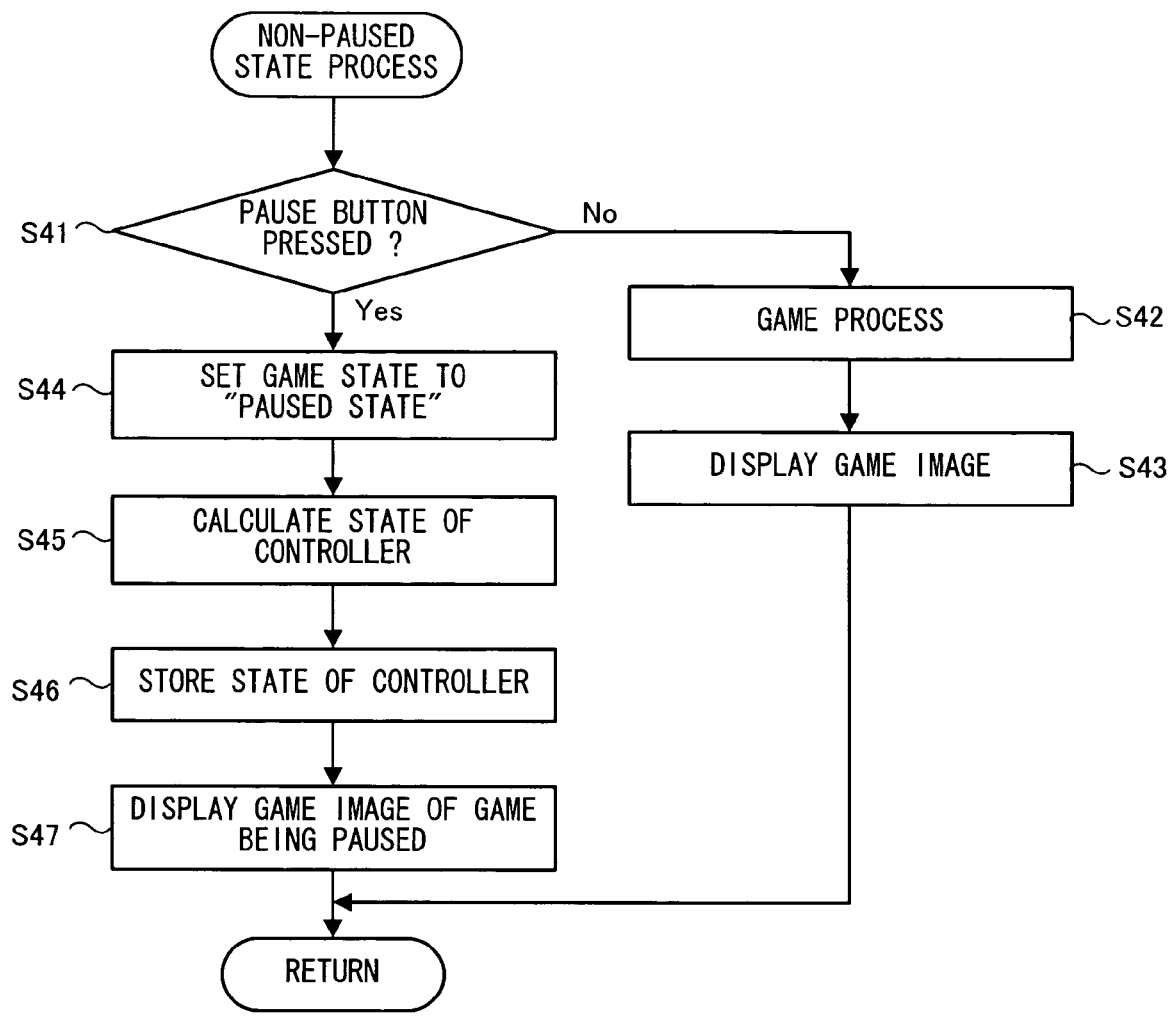
FIG. 25 is a flow chart showing the details of the non-paused state process in the second embodiment.
Figure 26:
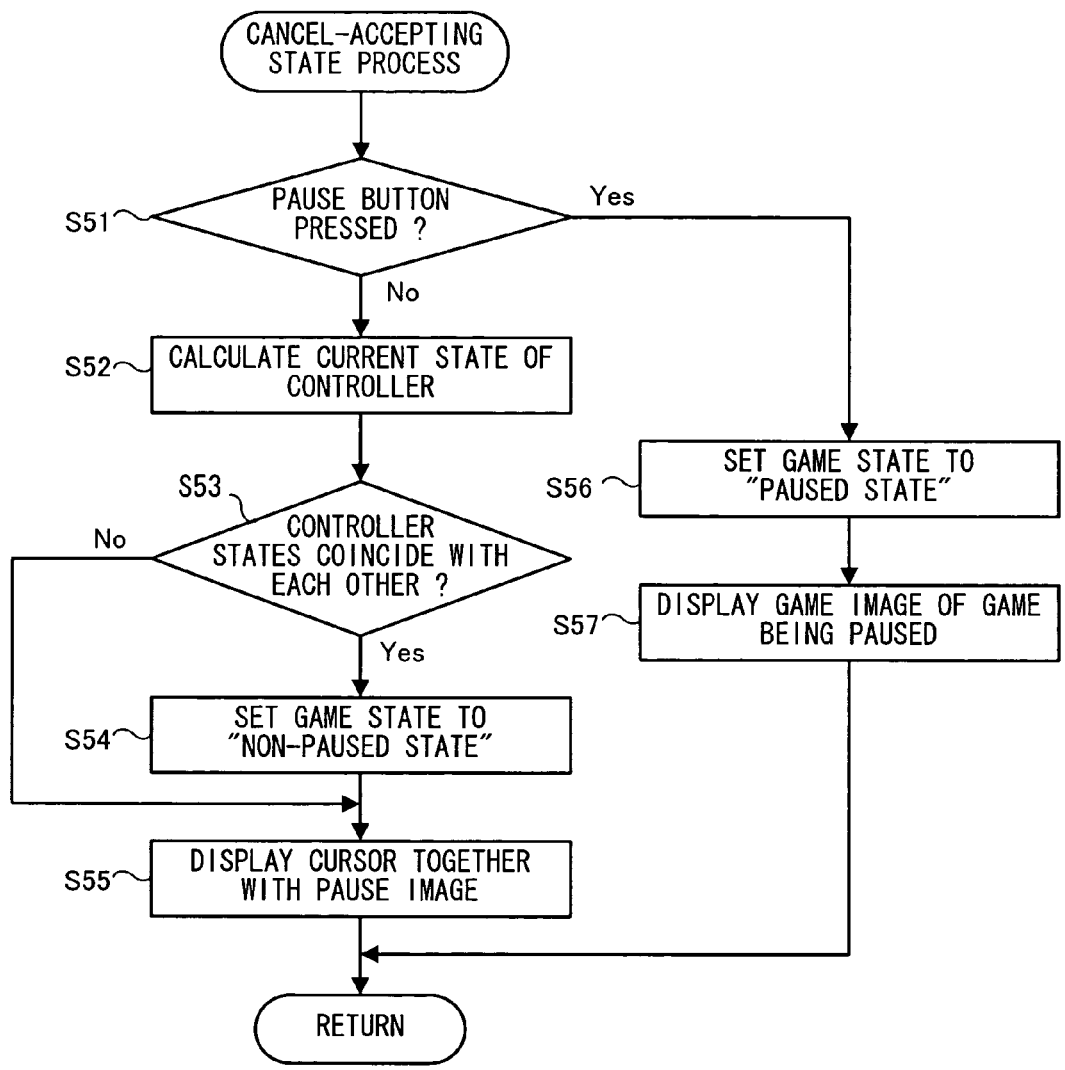
FIG. 26 is a flow chart showing the details of the cancel-accepting state process in the second embodiment.

Referring now to FIGS. 25 and 26, the details of the game process performed by the video game device 3 in the second embodiment will be described. The main flow of the second embodiment is similar to that shown in the main flow chart of FIG. 16, and will not therefore be further described below. Since the control data obtained in step S3 in the second embodiment includes the marker position data and the control button data, the marker position data 623 and the control button data 622 are stored in the main memory 13 in step S3.

First, the non-paused state process of the second embodiment will now be described. FIG. 25 is a flow chart showing the details of the non-paused state process in the second embodiment. First, in step S41 of the non-paused state process, the CPU 10 determines whether or not the pause button (the start switch 32g in the second embodiment) has been pressed. Step S41 is the same as step S11 in the first embodiment. If the determination result of step S41 is positive, the process proceeds to step S44 to be described later. If the determination result of step S41 is negative, the process proceeds to step S42.

In step S42, the game process is performed, by which the game proceeds. In the second embodiment, the game process is a process of moving the first cursor 55 based on the position pointed at by the controller 7, and deforming the character 51 according to the position of the first cursor 55. Specifically, the CPU 10 determines the position pointed at by the controller 7, i.e., the position of the first cursor 55, based on the marker position represented by the marker position data 623 stored in the main memory 13. The method for calculating the position pointed at by the controller 7 is not limited to any particular method, and may be a method as follows, for example.

An example of a method for calculating the position pointed at by the controller 7 will now be described. The marker position data 623 obtained from the controller 7 represents two marker positions corresponding to the markers 8a and 8b, and the CPU 10 first calculates the middle point between the two marker positions from the marker position data. The position of the middle point is represented by the xy coordinate system for representing positions on the plane corresponding to the captured image. Then, the CPU 10 converts the coordinates representing the position of the middle point to coordinates in the coordinate system for representing positions on the screen of the monitor 2 (the x'y' coordinate system). Where the origin of the x'y' coordinate system is the upper left corner of the screen, and the downward direction is defined to be the positive y-axis direction thereof while the rightward direction is defined to be the positive x-axis direction thereof, this conversion can be done as follows. The x' coordinate of the pointed position can be obtained by reversing the sign of the x coordinate of the middle point and scaling it by a predetermined factor (e.g., a factor such that the length of the captured image in the x-axis direction in the xy coordinate system is made to coincide with the length of the screen in the x'-axis direction in the x'y' coordinate system). The y' coordinate of the pointed position can be obtained by scaling the y coordinate of the middle point by a predetermined factor (e.g., a factor such that the length of the captured image in the y-axis direction in the xy coordinate system is made to coincide with the length of the screen in the y'-axis direction in the x'y' coordinate system). The conversion from the x coordinate to the x' coordinate involves reversing the sign thereof because the movement direction of the middle point between the marker positions is opposite to the movement direction of the actual position pointed at by the controller 7 with respect to the left/right direction (the x-axis direction or the x'-axis direction). If the actual position pointed at by the controller 7 moves in the negative direction (the positive direction) of the x'-axis direction, the middle point between the marker positions moves in the positive direction (the negative direction) of the x-axis direction. The position represented by the calculated x' and y' coordinates is the position pointed at by the controller 7. In an alternative method for more accurately calculating the pointed position, the image is rotated about the center of the image so that a vector extending between the two marker positions is parallel to the y axis, and the above conversion process is performed on the middle point between the two marker positions after the rotation. With such a correction operation by rotating the image, it is possible to accurately calculate the pointed position even in a case where the controller 7 is tilted, for example.

In the second embodiment, the position pointed at by the controller 7, i.e., the position of the first cursor 55, is calculated as described above. Data representing the calculated position of the first cursor 55 is stored in the main memory 13 as the first cursor position data 637. In step S42, the CPU 10 deforms the character 51 according to the position of the first cursor 55. Although not shown in FIG. 24, data representing shapes of the character being deformed are stored in the main memory 13.

Then, in step S43, the CPU 10 produces a game image according to the processing results from step S42 and displays the produced game image on the monitor 2. Specifically, the first cursor 55 is displayed at the position determined in step S42, and the character 51 deformed in step S42 is displayed on the monitor 2 (FIG. 20). After step S43, the CPU 10 exits the non-paused state process.

In step S44, the game state is set to the paused state. Step S44 is the same as step S14 in the first embodiment. As in the first embodiment, the game process is paused as a result of step S14.

Then, in step S45, the state of the controller 7 is calculated. Specifically, the position pointed at by the controller 7 is calculated in the second embodiment. The method for calculating the position pointed at by the controller 7 is the same as that in step S42. Data representing the calculated pointed position is stored in the main memory 13 as the first cursor position data 637.

Then, in step S46, the state of the controller 7 calculated in step S45 is stored. In the second embodiment, the CPU 10 stores data representing the position pointed at by the controller 7, i.e., the first cursor position data 637, in the main memory 13 as the paused state data 633. The type of data stored in step S46 is not limited to any particular type as long as it represents the state of the controller 7 regarding the position pointed at by the controller 7. For example, the marker position data obtained in step S3 may be stored as the paused state data 633, or data representing the position of the middle point between the two marker positions obtained from the marker position data may be stored as the paused state data 633. Alternatively, data representing the shape of the character 51 may be stored as the paused state data 633, for example.

Then, in step S47, the CPU 10 displays the game image of the game being paused on the monitor 2. Specifically, the game image at the time when the game process was paused is displayed on the monitor 2 with the pause image 52 superimposed thereon (see FIG. 21). The game image at the time when the game process was paused is the game image displayed in step S43 in the previous frame. After step S47, the CPU 10 exits the non-paused state process.

The paused state process in the second embodiment is similar to that of the first embodiment, and will not be further described below. The cancel-accepting state process of the second embodiment will now be described. FIG. 26 is a flow chart showing the details of the cancel-accepting state process in the second embodiment.

First, in step S51 of the cancel-accepting state process, the CPU 10 determines whether or not the pause button (the start switch 32g in the second embodiment) has been pressed. Step S51 is the same as step S31 in the first embodiment. If the determination result of step S51 is positive, the process proceeds to step S56 to be described later. If the determination result of step S51 is negative, the process proceeds to step S52.

In step S52, the current state of the controller 7 is calculated. In the second embodiment, the position pointed at by the controller 7, i.e., the position of the second cursor 56, is calculated as the current state of the controller 7. The position of the second cursor 56 is calculated based on the marker position data 623 stored in the main memory 13. The specific method for calculating the position of the second cursor 56 is the same as that for calculating the position of the first cursor 55. Data representing the calculated position of the second cursor 56 is stored in the main memory 13 as the second cursor position data 638.

Then, in step S53, the CPU 10 compares the current state (pointed position) of the controller 7 with the state (pointed position) of the controller 7 at the time of the pause operation to determine whether or not they coincide with each other. The position being currently pointed at by the controller 7 is represented by the second cursor position data 638 stored in the main memory 13. The position pointed at by the controller 7 at the time of the pause operation is represented by the paused state data 633 stored in the main memory 13. Thus, the CPU 10 compares the inclination represented by the second cursor position data 638 with the inclination represented by the paused state data 633. As described above, in the second embodiment, it is determined that the two positions coincide with each other as long as they are close enough to each other even though they do not completely coincide with each other. Specifically, it is determined that the two positions coincide with each other if the distance therebetween is smaller than a value represented by the threshold value data 634, and that they do not coincide with each other if the distance is greater than or equal to the threshold value.

If it is determined in step S53 that the position being currently pointed at by the controller 7 and the pointed position at the time of the pause operation coincide with each other, the process proceeds to step S54. If it is determined that the position being currently pointed at by the controller 7 and the pointed position at the time of the pause operation do not coincide with each other, the process proceeds to step S55, skipping step S54.

In step S54, the game state is set to the non-paused state. Step S54 is the same as step S34 of the first embodiment. Therefore, in the next frame (unless the pause button is pressed again), the pause is canceled to resume the game process.

In step S55, the CPU 10 displays the second cursor 56, in addition to the game image of the game being paused, on the monitor 2 (see FIG. 22). The game image of the game being paused is the game image displayed in step S36. Thus, in the present embodiment, the two cursors 55 and 56 are displayed in the cancel-accepting state. Therefore, the player can control the position pointed at by the controller 7 (the position and/or the orientation of the controller 7) while referring to the cursors 55 and 56 so that the position of the second cursor 56 and the position of the first cursor 55 coincide with each other. Thus, the operation of canceling the pause is simplified. After step S55, the CPU 10 exits the cancel-accepting state process.

In step S56, the game state is set to the paused state. Step S56 is the same as step S37 of the first embodiment. The game process is paused as a result of step S56. As described above, in the present embodiment, if the pause button is pressed in the cancel-accepting state, the game state returns back to the paused state.

Then, in step S57, the CPU 10 displays the game image of the game being paused on the monitor 2 (see FIG. 12). Step S57 is the same as step S38 of the first embodiment. After step S57, the CPU 10 exits the cancel-accepting state process.

As described above, in the cancel-accepting state of the second embodiment, the position being currently pointed at by the controller 7 is compared with the position pointed at by the controller 7 at the time of the pause operation to determine whether or not they coincide with each other (step S53). If they coincide with each other, the game state transitions to the non-paused state (step S54), thereby resuming the game. The process performed by the video game device 3 in the second embodiment is as described above.

As described above, in the second embodiment, when the game process is paused, the position pointed at by the controller 7 (the cursor position) at the time of the pause operation is stored. Then, the position being currently pointed at by the controller 7 and the position pointed at by the controller 7 at the time of the pause operation are compared with each other, and the pause is canceled when the two positions coincide with each other. Thus, it is possible to ensure that when the pause is canceled to resume the game, the position pointed at by the controller 7 is the same as that before the game was paused. Therefore, in the second embodiment, as in the first embodiment, it is possible to prevent a mistake by the player due to a sudden change in the game operation before and after a pause, thus improving the controllability. In the second embodiment, the second cursor is displayed in the cancel-accepting state, thus making it easier for the player to cancel a pause. In the cancel-accepting state, only the second cursor is displayed, and the image of the character itself, determined based on the second cursor, is not displayed, thus reducing the processing load on the CPU 10 as compared with a case where the image of the character is displayed.

(Variation of Data Used in Game Process)

The first embodiment is directed to a game process performed based on the inclination (orientation) of the controller 7, and the second embodiment is directed to a game process performed based on the position pointed at by the controller 7 changing according to the position or the orientation of the controller 7. In an alternative embodiment, the game process may be performed based on the state of the controller 7 regarding at least one of the position and the orientation thereof. Herein, "the state of the controller 7 regarding at least one of the position and the orientation thereof" represents a concept encompassing the position of the controller 7, the orientation thereof, the change in the position thereof (the velocity thereof), the change in the orientation thereof (the angular velocity thereof), etc. For example, the video game device 3 may calculate the position of the controller 7 to perform the game process using the calculated position, or may calculate the amount of change in the position or the orientation (the velocity or the angular velocity) of the controller 7 to perform the game process using the calculated amount of change.

For example, the video game device 3 can calculate the orientation of the controller 7 with respect to the rotation about the Z' axis by using the marker positions calculated by the image capturing/processing section 35. Specifically, when the controller 7 is turned about the Z' axis, the direction along the line extending between the two marker positions turns as the controller 7 is turned. Therefore, the orientation can be calculated based on the direction along the line extending between the two marker positions. The video game device 3 may perform the game process based on the orientation. The video game device 3 can calculate the distance from the markers 8a and 8b to the controller 7 by using the marker positions calculated by the image capturing/processing section 35. The length between the two marker positions increases as the controller 7 is moved closer to the markers 8a and 8b, and decreases as the controller 7 is moved away from the markers 8a and 8b. Therefore, the distance can be calculated based on the length between the two marker positions. The video game device 3 may perform the game process based on the distance.

The acceleration sensor 37 is used for calculating the inclination of the controller 7 in the first embodiment, and the image capturing/processing section 35 is used for calculating the position pointed at by the controller 7 in the second embodiment. In an alternative embodiment, any suitable sensor may be used for calculating the state of the controller 7, which is to be reflected to the game process. In an alternative embodiment, the state of the controller 7 may be calculated using both the acceleration sensor 37 and the image capturing/processing section 35. For example, the image capturing/processing section 35 may be used to calculate the position pointed at by the controller 7, and the acceleration sensor 37 may be used to calculate the orientation of the controller 7. Then, the game process is performed based on the position pointed at by the controller 7 and the orientation of the controller 7. For example, where the orientation of the controller 7 with respect to the rotation about the Z' axis is calculated, the orientation may be calculated by using both the acceleration sensor 37 and the image capturing/processing section 35 (specifically, selectively using one of them at a time). Specifically, the orientation may be calculated by using the marker position data obtained from the image capturing/processing section 35 in cases where the markers 8a and 8b can be captured by the image capturing/processing section 35, and the orientation may be calculated by using the acceleration vector obtained from the acceleration sensor 37 in cases where the markers 8a and 8b cannot be captured by the image capturing/processing section 35.

(Variation of Game Data Stored Upon Pausing)

The output of the acceleration sensor (the acceleration vector) is stored at the time of the pause operation in the first embodiment, and the position pointed at by the controller 7 (the position of the first cursor 55) is stored in the second embodiment. In an alternative embodiment, data to be stored at the time of the pause operation may be any suitable game data that is used in the game process and that changes according to the state of the controller 7 (regarding at least one of the position and the orientation thereof). Herein, the game data represents a concept encompassing data representing the state of the controller 7 (the acceleration data 621, the first cursor position data 637, and the marker position data 623), and data calculated therefrom (the character direction data 632, and data representing the shape of the character 51). Where the game data to be stored and the game data representing the current state of the controller 7 are compared with each other in the step S32 of the first embodiment or in the step S53 of the second embodiment, the type of the game data representing the current state needs to be changed according to the type of the game data to be stored. For example, where the character direction data is to be stored, instead of the acceleration data, in the first embodiment, the current character direction data is calculated before step S32, and the calculated character direction data is compared with the stored character direction data.

(Variation of Guide Image)

In the cancel-accepting state, the models 53 and 54 are displayed in the first embodiment and the second cursor 56 is displayed on the second embodiment. The models and the cursor are images for guiding the player to the state of the controller 7 at the time of the pause operation. Thus, these images are displayed for the purpose of facilitating the player's operation of canceling the pause. The guide images are not limited to models or cursors, but may be, in an alternative embodiment, numerical values or arrows indicating how the operation can be done, for example. Specifically, in the first embodiment, there may be displayed a numerical value representing the angular difference between the inclination of the controller 7 at the time of the pause operation and the current inclination. In the second embodiment, there may be displayed an arrow indicating the direction in which the pointed position should be moved. In an alternative embodiment, the image of the controlled object may be displayed in the cancel-accepting state for guiding the player. This will now be described in detail with reference to FIGS. 27 and 28.

Figure 27:
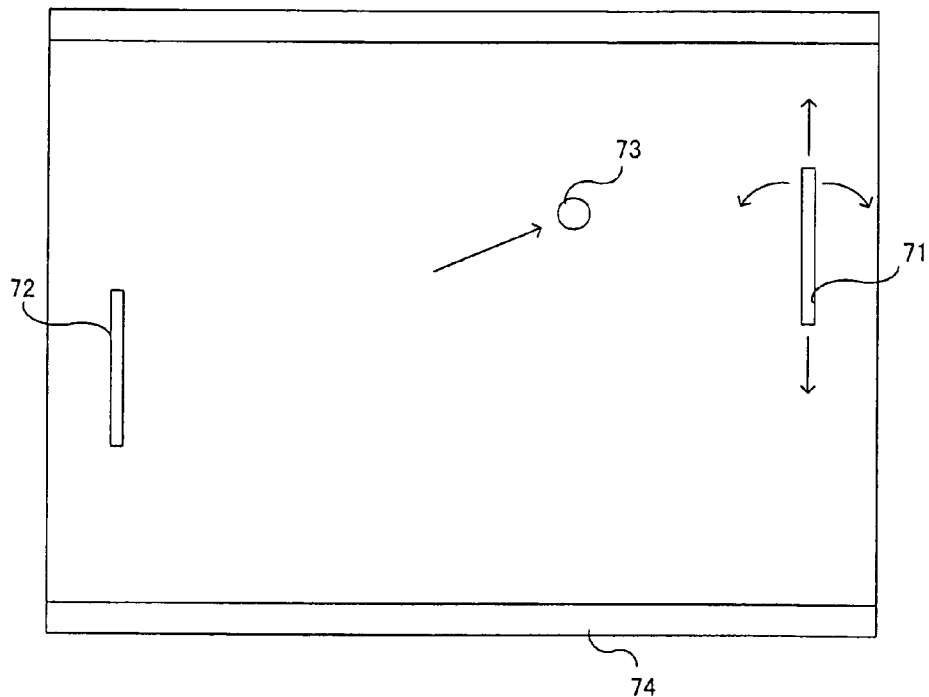
FIG. 27 shows an example of a game image in an alternative embodiment.
Figure 28:
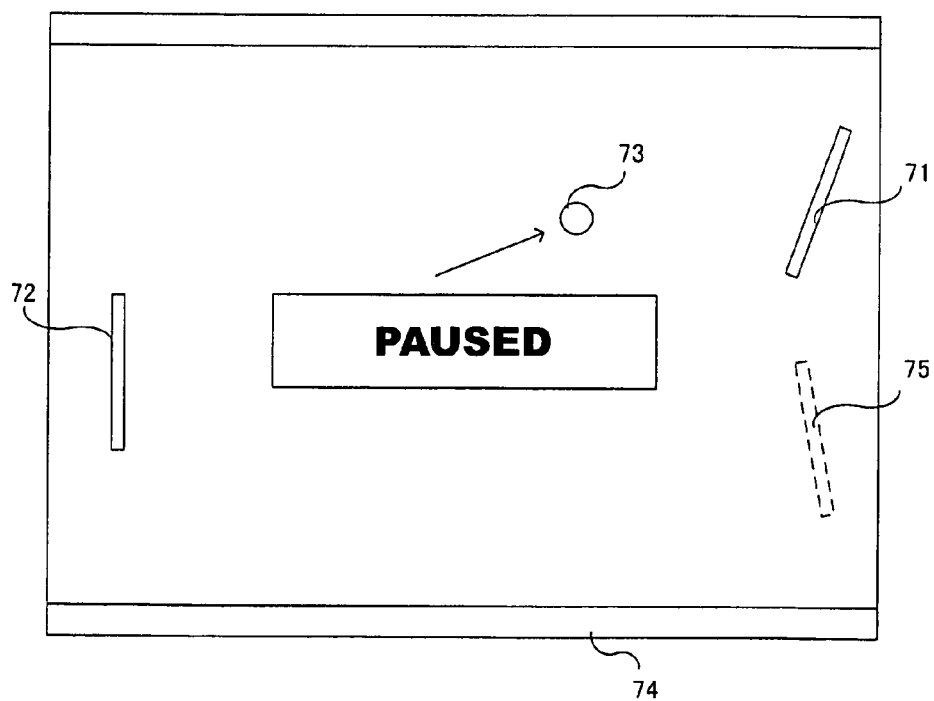
FIG. 28 shows an example of a game image where the game shown in FIG. 27 has transitioned to the cancel-accepting state.

FIGS. 27 and 28 each show an example of a game image in an alternative embodiment. In FIG. 27, plate-shaped objects 71 and 72, a ball object 73 and a wall object 74 are arranged in a two-dimensional game space. The video game shown in FIG. 27 is a hockey game in which the ball object 73 is hit between the plate-shaped object 72, which is controlled by the CPU 10 of the video game device 3, and the plate-shaped object 71. The plate-shaped object 71 is an object controlled by the player (player object). The player can move and turn the plate-shaped object 71 in the up/down and left/right directions of the screen (see arrows in FIG. 27). Specifically, the plate-shaped object 71 is moved in the up/down and left/right directions of the screen according to the position pointed at by the controller 7, and is turned according to the inclination of the controller 7.

Figure 29:
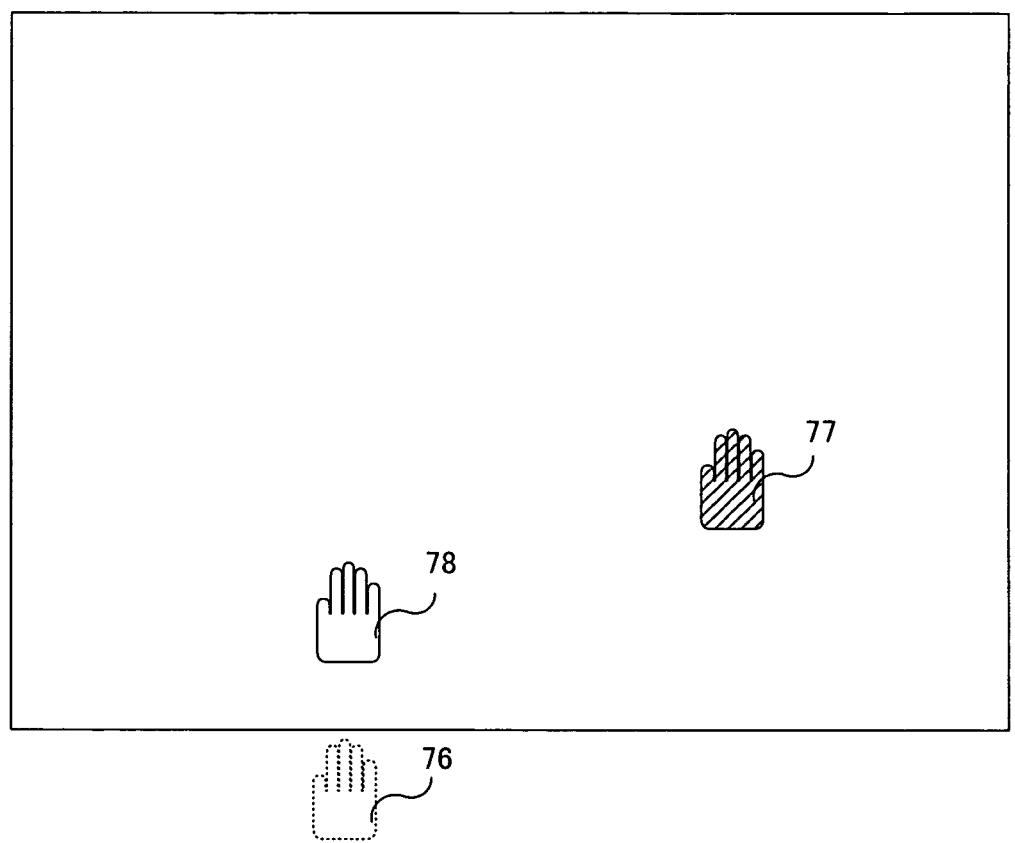
FIG. 29 shows an example of a game image in an alternative embodiment.

FIG. 28 shows an example of a game image of the video game of FIG. 27 where the game has transitioned to the cancel-accepting state. In FIG. 28, the plate-shaped object 71 is fixed in the state at the time of the pause operation. The video game device 3 also displays a guide object 75 representing the state of a player object as calculated from the current state of the controller 7. Specifically, in the cancel-accepting state, the video game device 3 calculates the position pointed at by the controller 7 to determine the position of the guide object 75 on the screen based on the calculated pointed position, and calculates the inclination of the controller 7 to determine the direction of the guide object 75 based on the calculated inclination. The video game device 3 determines whether or not the position of the plate-shaped object 71 and the position of the guide object 75 coincide with each other and the direction of the plate-shaped object 71 and the direction of the guide object 75 coincide with each other. If the positions coincide with each other and the directions coincide with each other, the pause is canceled to resume the game. As described above, if there are a plurality of types of states of the controller 7 (in the above example, there are two types: the position pointed at by the controller 7, and the inclination of the controller 7), it is preferred that the pause is canceled when each state at present coincides with that at the time of the pause operation. As shown in FIG. 28, the guide image may be an image of the controlled object.

Where the controlled object is moved around on the screen as in the second embodiment, there may be a situation where the controlled object is not displayed (or only a part of it is displayed) on the screen due to the settings of the display device (the monitor 2), etc. FIG. 29 shows an example of a game image in an alternative embodiment. In FIG. 29, it is assumed that only three cursors 76 to 78 are displayed for the sake of simplicity. The three cursors 76 to 78 shown in FIG. 29 are the controlled cursor 76, the guide cursor 77, and the reference cursor 78. The controlled cursor 76 is a cursor, which is the controlled object in the non-paused state.

In the example of FIG. 29, the reference cursor 78 is being displayed at a predetermined distance upward from the controlled cursor 76, which is being out of the screen, in the cancel-accepting state. The guide cursor 77 is displayed at the position determined based on the position being currently pointed at by the controller 7. The guide cursor 77 is not located at the position being currently pointed at by the controller 7, but is located at the predetermined distance upward from the pointed position. In the cancel-accepting state, the player controls the guide cursor 77 so that the guide cursor 77 coincides with the reference cursor 78. When the guide cursor 77 coincides with the reference cursor 78, the pause is canceled to resume the game process. The guide image does not always need to be the image of the controlled object (the controlled cursor 76) as shown in FIG. 29, but an image other than the image of the controlled object may be used for the alignment operation. Thus, as shown in FIG. 29, it is possible to display the guide image so that it can easily be seen even if the controlled object is displayed near the edge of the screen and is not easily seen at the time of the pause operation.

(Variation of Paused State Process)

In the first embodiment and the second embodiment, the video game device 3 transitions to the cancel-accepting state when the cancel-accepting button is pressed in the paused state. In an alternative embodiment, the video game device 3 may transition to the cancel-accepting state after the elapse of a predetermined amount of time since when the game process is paused. The variation of the paused state process will now be described with reference to FIG. 30.

Figure 30:
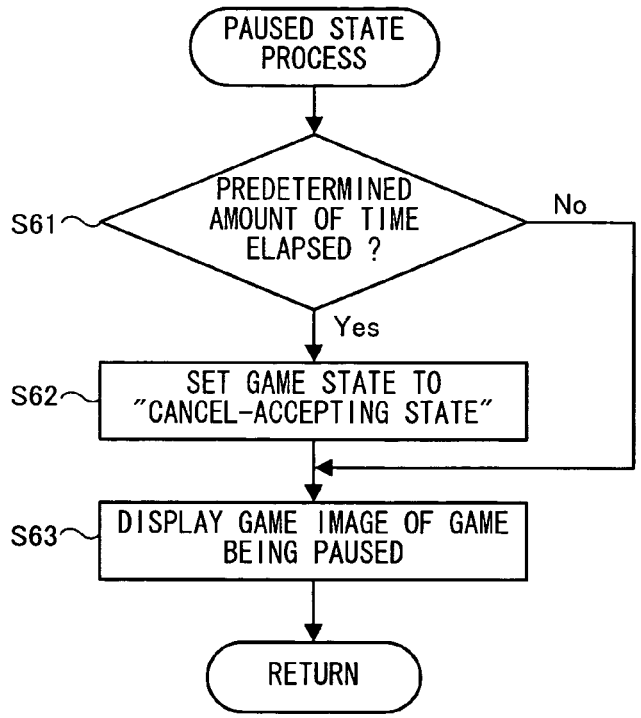
FIG. 30 is a flow chart showing a variation of the paused state process.

FIG. 30 is a flow chart showing the variation of the paused state process. First, in step S61 of the paused state process shown in FIG. 30, the CPU 10 determines whether or not a predetermined amount of time has elapsed since when the game process is paused. The predetermined amount of time may be a predetermined fixed value specified in the video game program 61, or a value variably based on an instruction from the player or other conditions. If it is determined in step S61 that the predetermined amount of time has elapsed, the process proceeds to step S62. If it is determined that the predetermined amount of time has not elapsed, the process proceeds to step S63, skipping step S62. In step S62, the game state is set to the cancel-accepting state. Step S62 is the same as step S22 in the first embodiment. Step S63 is the same as step S23 in the first embodiment.

As described above, in an alternative embodiment, whether or not to transition from the paused state to the cancel-accepting state may be determined based on the amount of time elapsed since when the game process is paused. Then, the player does not have to perform the operation of transitioning to the cancel-accepting state (the operation of pressing the cancel-accepting button in the first embodiment), thus facilitating the player's operation. Since an amount of time needs to elapse from the pause before the game state can transition to the cancel-accepting state, it is possible to prevent the player from inadvertently satisfying the pause-canceling condition immediately after the pause to thereby inadvertently cancel the pause.

In an alternative embodiment, the video game device 3 may start accepting a pause-canceling operation when the difference between the current state of the controller 7 and that at the time of the pause operation becomes larger than a predetermined reference degree in the paused state. The variation of the paused state process will now be described with reference to FIG. 31.

Figure 31:
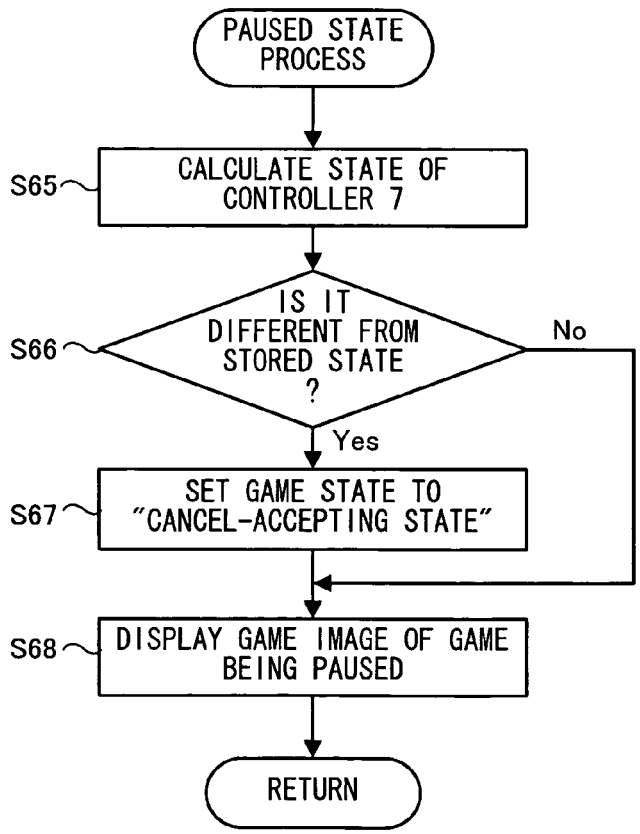
FIG. 31 is a flow chart showing another variation of the paused state process.

FIG. 31 is a flow chart showing another variation of the paused state process. First, in step S65 of the paused state process shown in FIG. 31, the CPU 10 calculates the state of the controller 7 (regarding at least one of the position and the orientation thereof). For example, in the second embodiment, the CPU 10 calculates the position pointed at by the controller 7. Then, data representing the calculated state is stored in the main memory 13. At this point in time, data representing the state at the time of the pause operation is stored in the main memory 13 as the paused state data 633.

Then, in step S66, the CPU 10 compares the current state of the controller 7 calculated in step S65 with the state at the time of the pause operation to determine whether or not the difference between the current state and the state at the time of the pause operation is larger than a predetermined reference. For example, in the case of the first embodiment, the CPU 10 may determine whether or not the current inclination of the controller 7 is different from the inclination at the time of the pause operation by a predetermined angle. In the case of the second embodiment, the CPU 10 may determine whether or not the position being currently pointed at by the controller 7 is away from the pointed position at the time of the pause operation by a predetermined distance or more. If the determination result of step S66 is positive, the process proceeds to step S67. If the determination result of step S66 is negative, the process proceeds to step S68, skipping step S67. Step S67 is the same as step S22 in the first embodiment. Step S68 is the same as step S23 in the first embodiment.

As described above, in an alternative embodiment, the game state may transition from the paused state to the cancel-accepting state when the current state of the controller 7 has become substantially different from that at the time of the pause operation in the paused state. Then, the player does not have to perform the operation of transitioning to the cancel-accepting state, thus facilitating the player's operation. Since the current state of the controller 7 needs to be substantially different from the state at the time of the pause operation before the game state can transition to the cancel-accepting state, it is possible to prevent the player from inadvertently satisfying the pause-canceling condition immediately after the pause to thereby inadvertently cancel the pause.

(Variation Regarding Time when Game Process is Paused)

In the above embodiment, the video game device 3 pauses the game process at the point in time when the pause button is pressed. In an alternative embodiment, the game process may be paused at a predetermined point being slightly before (specifically, a few frames before) the pause button is pressed. Specifically, the portion of the game process after the predetermined point in time until when the pause button is pressed may be invalidated, wherein the game process is resumed with the game state at the predetermined point in time slightly before when the pause button is pressed. Then, the game process can be paused at a point in time as intended by the player even in a case where the position or the orientation of the controller 7 may be changed as the player presses the pause button.

(Variation for Multiple Players)

While the above embodiments are directed to cases where there is only one player, the above embodiments are applicable to cases where there are multiple players. Each player controls a different controller 7. Accordingly, in the cancel-accepting state, the video game device 3 compares, for each controller, the current controller state with the state of the controller at the time of the pause operation. The pause is canceled to resume the game process only when it is determined that the current state coincides with the state at the time of the pause operation for all of the controllers. The game state may be transitioned from the paused state to the cancel-accepting state when the pause button of one of the controllers is pressed or when the pause buttons of all the controllers are pressed. Instead of determining whether the pause button has been pressed, the transition can be made based on a condition as shown in FIG. 30 or FIG. 31.

Thus, example embodiments of the present invention can be used in a video game device or a video game program, for example, with an objective of improving the controllability of the video game when a pause is canceled.

While example embodiments of the invention have been described in detail, the foregoing description is in all aspects illustrative and not restrictive. It is understood that numerous other modifications and variations can be devised without departing from the scope of the invention.

What is claimed is:

1. A video game device for performing a game process based on a state of an input device regarding at least one of a position and an orientation of the input device, the video game device comprising:
    game data obtaining programmed logic circuitry for successively obtaining game data, which changes according to the state of the input device and is used in the game process;
    pausing programmed logic circuitry for pausing the game process;
    storage memory for storing game data obtained at a point in time when the game process is paused;
    cancel-accepting programmed logic circuitry for starting to accept cancellation of the pause while the game process is being paused;
    a first comparator for successively comparing current game data, which is successively obtained by the game data obtaining programmed logic circuitry, with the game data stored in the storage memory, after starting to accept cancellation of the pause; and
    cancellation programmed logic circuitry for canceling the pause to resume the game process when a difference between a value of the current game data and a value of the game data stored in the storage memory becomes smaller than a predetermined reference.

2. The video game device according to claim 1, further comprising an image display programming logic circuitry for generating an image representing the value of the game data stored in the storage memory and an image representing the value of the current game data on a display device, after starting to accept cancellation of the pause.

3. The video game device according to claim 1, wherein:
    the input device includes image capturing device for capturing an image of a predetermined imaging target;
    the video game device further comprises a position calculator for calculating coordinates of a position of the imaging target in the captured image obtained by the image capturing device; and
    the game data obtaining programmed logic circuitry obtains, as the game data, data representing the coordinates, or data corresponding to a position or an orientation of the input device calculated based on the coordinates.

4. The video game device according to claim 1, wherein:
    the input device includes an acceleration sensor;
    the game data obtaining programmed logic circuitry obtains, as the game data, data representing an output from the acceleration sensor, or data corresponding to an orientation of the input device calculated based on the output from the acceleration sensor.

5. The video game device according to claim 1, wherein:
    the input device outputs data representing a state of the input device regarding a position or an orientation thereof; and
    the game data obtaining programmed logic circuitry obtains, as the game data, the data outputted from the input device.

6. The video game device according to claim 1, wherein:
    the input device outputs data representing a state of the input device regarding a position or an orientation thereof; and
    the game data obtaining programmed logic circuitry calculates and obtains, as the game data, data for controlling an object present in a virtual game space based on data outputted from the input device.

7. The video game device according to claim 1, wherein the cancel-accepting programmed logic circuitry starts to accept cancellation of a pause when instructed by a player.

8. The video game device according to claim 7, wherein:
    the input device includes a control switch; and
    the cancel-accepting programmed logic circuitry starts to accept cancellation of a pause when the control switch is operated.

9. The video game device according to claim 1, wherein the cancel-accepting programmed logic circuitry starts to accept cancellation of a pause when a predetermined amount of time elapses since when the game process is paused.

10. The video game device according to claim 1, wherein the cancel-accepting programmed logic circuitry includes:
    a second comparator for comparing current game data successively obtained by the game data obtaining programmed logic circuitry with the game data stored in the storage memory after the game process is paused; and cancel-accepting programmed logic circuitry for starting to accept cancellation of the pause when the difference between the value of the current game data and the value of the game data stored in the storage memory becomes larger than a predetermined reference.

11. A computer-readable storage medium storing a video game program to be executed by a computer of a video game device for performing a game process based on a state of an input device regarding at least one of a position and an orientation of the input device, the video game program instructing the computer to perform:
   a game data obtaining step of successively obtaining game data, which changes according to the state of the input device and is used in the game process;
   a pausing step of pausing the game process;
   a storage step of storing, in a memory of the video game device, game data obtained at a point in time when the game process is paused;
   a cancel-accepting step of starting to accept cancellation of the pause while the game process is being paused;
   a first comparison step of successively comparing current game data, which is successively obtained in the game data obtaining step, with the game data stored in the storage memory, after starting to accept cancellation of the pause; and
   a pause-canceling step of canceling the pause to resume the game process when a difference between a value of the current game data and a value of the game data stored in the storage memory becomes smaller than a predetermined reference.

12. The storage medium according to claim 11, wherein the video game program instructs the computer to further perform an image generating step of generating successively displays of an image representing the value of the game data stored in the memory and an image representing the value of the current game data on a display device, after starting to accept cancellation of the pause.

13. The storage medium according to claim 11, wherein the input device includes image capturing device for capturing an image of a predetermined imaging target;
   the video game program instructs the computer to further perform a position calculation step of calculating coordinates of a position of the imaging target in the captured image obtained by the image capturing device; and
   in the game data obtaining step, the computer obtains, as the game data, data representing the coordinates, or data corresponding to a position or an orientation of the input device calculated based on the coordinates.

14. The storage medium according to claim 11, wherein:
   the input device includes an acceleration sensor; and
   in the game data obtaining step, the computer obtains, as the game data, data representing an output from the acceleration sensor, or data corresponding to an orientation of the input device calculated based on the output from the acceleration sensor.

15. The storage medium according to claim 11, wherein:
   the input device outputs data representing a state of the input device regarding a position or an orientation thereof; and
   in the game data obtaining step, the computer obtains, as the game data, the data outputted from the input device.

16. The storage medium according to claim 11, wherein:
   the input device outputs data representing a state of the input device regarding a position or an orientation thereof; and
   in the game data obtaining step, the computer calculates and obtains, as the game data, data for controlling an object present in a virtual game space based on data outputted from the input device.

17. The storage medium according to claim 11, wherein in the cancel-accepting step, the computer starts to accept cancellation of a pause when instructed by a player.

18. The storage medium according to claim 17, wherein:
   the input device includes a control switch; and
   in the cancel-accepting step, the computer starts to accept cancellation of a pause when the control switch is operated.

19. The storage medium according to claim 11, wherein in the cancel-accepting step, the computer starts to accept cancellation of a pause when a predetermined amount of time elapses since when the game process is paused.

20. The storage medium according to claim 11, wherein the cancel-accepting step includes:
   a second comparison step of comparing current game data successively obtained in the game data obtaining step with the game data stored in the memory after the game process is paused; and
   a cancel-accepting step of starting to accept cancellation of the pause when the difference between the value of the current game data and the value of the game data stored in the memory becomes larger than a predetermined reference.

* * * * *